(12) United States Patent
Bonutti

(10) Patent No.: US 7,234,730 B2
(45) Date of Patent: Jun. 26, 2007

(54) TRACTION CONTROL SYSTEM

(75) Inventor: Peter M. Bonutti, Effingham, IL (US)

(73) Assignee: Marctec, LLC, Effingham, IL (US)

( * ) Notice: Subject to any disclaimer, the term of this patent is extended or adjusted under 35 U.S.C. 154(b) by 0 days.

(21) Appl. No.: 11/286,820

(22) Filed: Nov. 23, 2005

(65) Prior Publication Data

US 2006/0096580 A1    May 11, 2006

Related U.S. Application Data

(60) Continuation of application No. 10/893,513, filed on Jul. 16, 2004, now Pat. No. 6,978,767, which is a division of application No. 10/386,992, filed on Mar. 12, 2003, now Pat. No. 6,793,177, which is a continuation-in-part of application No. 10/287,379, filed on Nov. 4, 2002, now Pat. No. 6,824,108.

(51) Int. Cl.
  *B60K 28/16*    (2006.01)
(52) U.S. Cl. ....................................... 280/757
(58) Field of Classification Search ................. 280/757
  See application file for complete search history.

(56) References Cited

U.S. PATENT DOCUMENTS

| 2,077,071 | A |   | 4/1937  | Rose    |          |
|-----------|---|---|---------|---------|----------|
| 2,453,595 | A |   | 11/1948 | Roesnthal |        |
| 2,677,516 | A | * | 5/1954  | Pilling | 244/103 R |
| 3,182,934 | A | * | 5/1965  | Clark   | 244/103 R |
| 3,455,266 | A |   | 7/1969  | Giles   |          |
| 3,774,867 | A |   | 11/1973 | Quinn   |          |
| 3,893,434 | A |   | 7/1975  | Thatcher et al. |    |
| 4,203,423 | A | * | 5/1980  | Ricci   | 126/271.1 |
| 4,230,448 | A |   | 10/1980 | Ward et al. |      |
| 4,324,307 | A | * | 4/1982  | Schittino et al. | 180/313 |
| 4,352,459 | A |   | 10/1982 | Berger et al. |    |
| 4,363,991 | A |   | 12/1982 | Edelman |          |
| 4,401,089 | A |   | 8/1983  | Casazar et al. |   |
| 4,556,020 | A |   | 12/1985 | Hickling |         |
| 4,628,890 | A |   | 12/1986 | Freeman |          |
| 4,741,498 | A |   | 5/1988  | Gerhardt |         |
| 4,802,642 | A |   | 2/1989  | Mangiarotty |      |
| 4,834,320 | A | * | 5/1989  | Tyson   | 244/103 R |
| 4,848,510 | A | * | 7/1989  | Ahmed   | 180/309  |

(Continued)

OTHER PUBLICATIONS

Audio Spot Light—Holosonic Research Labs Inc., of Watertown, Massachusetts—Publication Date Unknown—© 2002.

(Continued)

*Primary Examiner*—Paul N. Dickson
*Assistant Examiner*—Joselynn Y. Sliteris
(74) *Attorney, Agent, or Firm*—Fleit Kain Gibbons Gutman Bongini & Bianco; Paul D. Bianco; Martin Fleit

(57) ABSTRACT

The present invention provides a traction control system for a vehicle. The traction control system includes an energy radiator positionable in proximal relation to at least one of the vehicle tires. The traction control system further includes a control system having a signal generator, with the signal generator generating an activation signal to selectively activate the energy radiator. The activated energy radiator generates an energy to heat the tire in response to the activation signal, thereby increasing the fraction of the tire.

14 Claims, 13 Drawing Sheets

U.S. PATENT DOCUMENTS

| | | | | |
|---|---|---|---|---|
| 4,932,610 | A | 6/1990 | Maestrello | |
| 4,986,248 | A | 1/1991 | Kobayashi et al. | |
| 4,989,810 | A | 2/1991 | Meier et al. | |
| 5,100,175 | A * | 3/1992 | Swallow et al. | 280/757 |
| 5,159,915 | A | 11/1992 | Saito et al. | |
| 5,301,996 | A * | 4/1994 | Theis | 296/180.1 |
| 5,330,100 | A | 7/1994 | Malinowski | |
| 5,350,035 | A * | 9/1994 | Bodier et al. | 180/271 |
| 5,365,490 | A | 11/1994 | Katz | |
| 5,450,498 | A | 9/1995 | Whitehead | |
| 5,573,686 | A * | 11/1996 | Lavicska | 219/202 |
| 5,797,563 | A | 8/1998 | Blackburn | |
| 5,845,480 | A | 12/1998 | DeFreitas et al. | |
| 5,901,928 | A | 5/1999 | Raskob | |
| 5,938,404 | A | 8/1999 | Domzalski et al. | |
| 6,229,899 | B1 | 5/2001 | Norris et al. | |
| 6,267,331 | B1 | 7/2001 | Wynanski et al. | |
| 6,270,118 | B1 * | 8/2001 | Ichikawa | 280/757 |
| 6,315,217 | B1 | 11/2001 | Park | |
| 6,359,990 | B1 | 3/2002 | Norris | |
| 6,488,217 | B1 * | 12/2002 | Donastorg | 239/131 |
| 6,570,333 | B1 | 5/2003 | Miller | |
| 6,601,776 | B1 | 8/2003 | Oljaca et al. | |
| 6,693,786 | B2 * | 2/2004 | Petrenko | 361/144 |
| 6,732,720 | B2 | 5/2004 | Kelemencky | |
| 6,848,726 | B1 * | 2/2005 | Horsham | 291/3 |
| 6,870,139 | B2 * | 3/2005 | Petrenko | 219/482 |
| 6,946,621 | B1 * | 9/2005 | Roseman | 219/202 |
| 7,034,257 | B2 * | 4/2006 | Petrenko | 219/482 |
| 2002/0149188 | A1 * | 10/2002 | Major | 280/757 |
| 2003/0116641 | A1 | 6/2003 | Ohnishi et al. | |
| 2003/0187123 | A1 | 10/2003 | Labude | |
| 2005/0224271 | A1 * | 10/2005 | Carr | 180/271 |

OTHER PUBLICATIONS

Aerospaceweb.org—Hypersonic Waveriders—Hypersonic Flow—Publication Date Unknown-© 1997-2002.

Racing Through Water Supercavitation, by Victoria Sturgeon, Nov. 2001.

Warp Drive Underwater—by Steven Ashley- May 17, 2001—Scientific American, Inc.

* cited by examiner

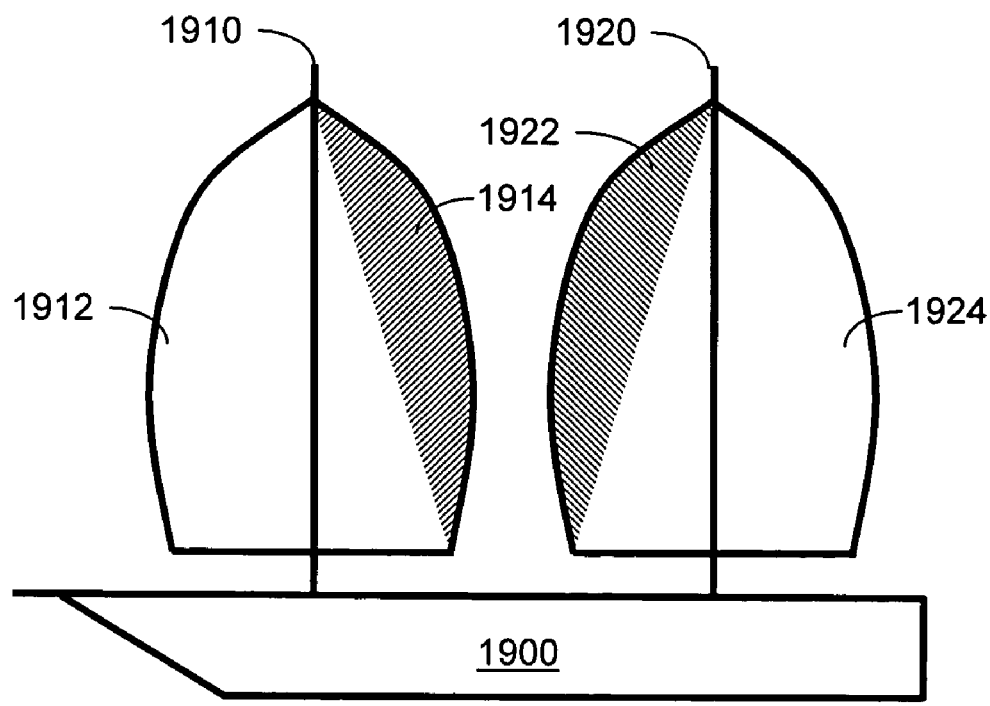
FIG. 19
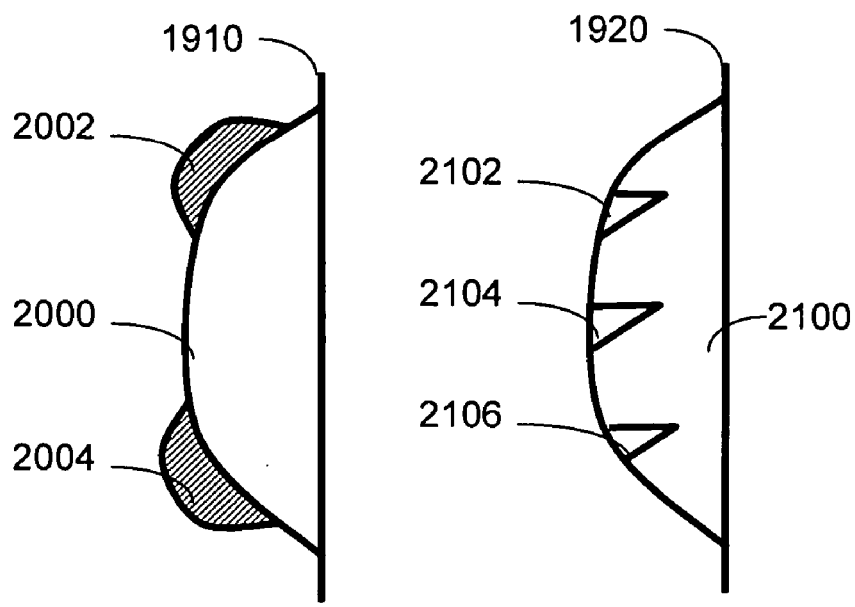
FIG. 20    FIG. 21

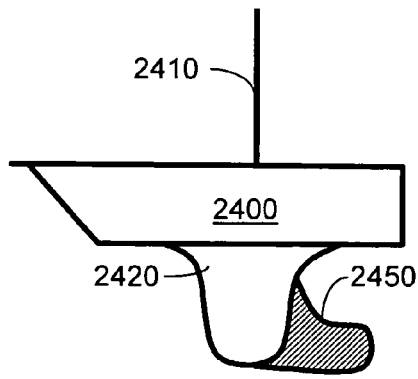
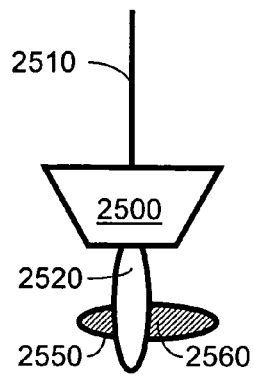
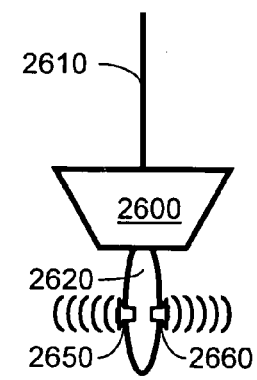
FIG. 24    FIG. 25    FIG. 26
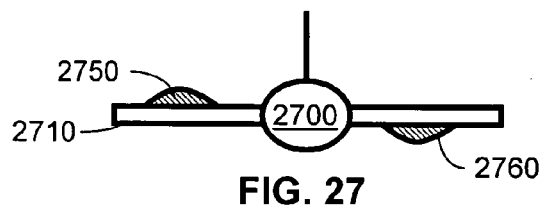
FIG. 27
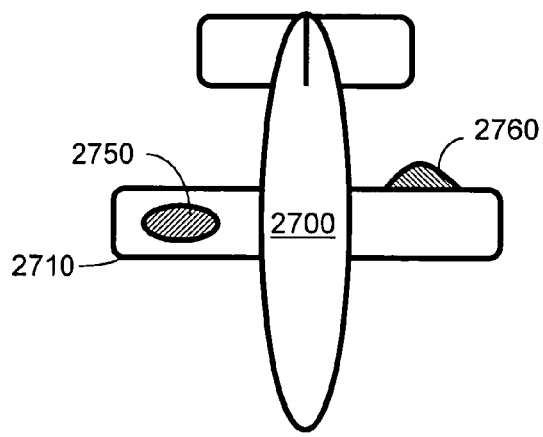
FIG. 28
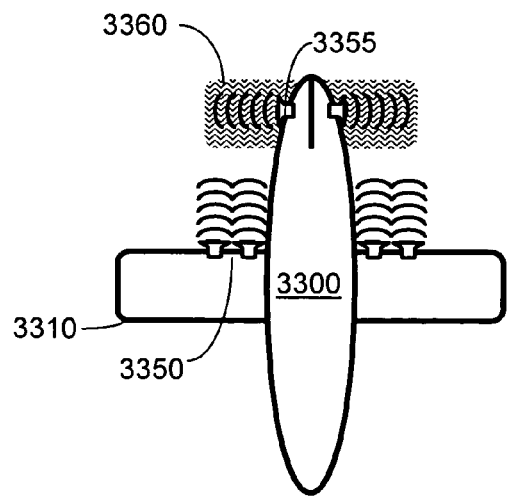
FIG. 33

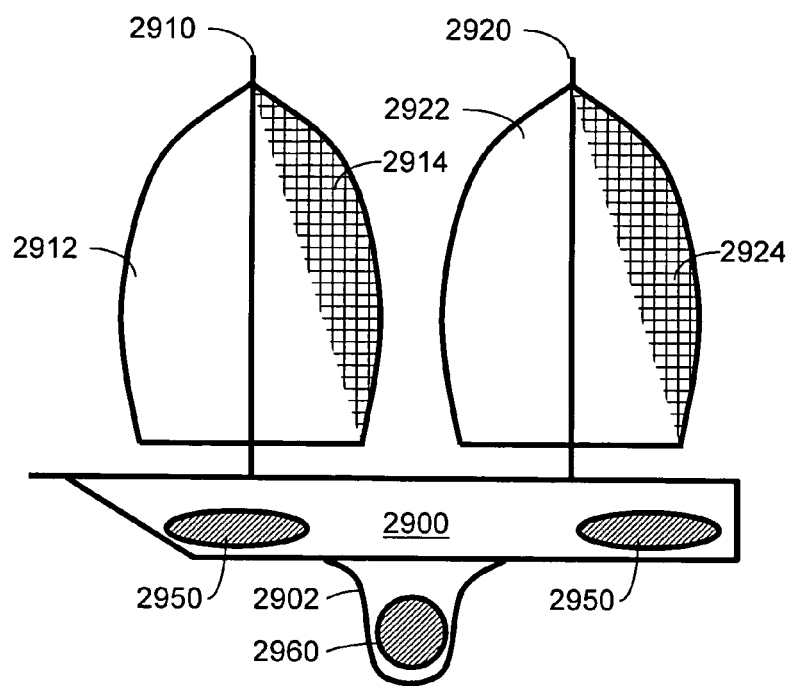
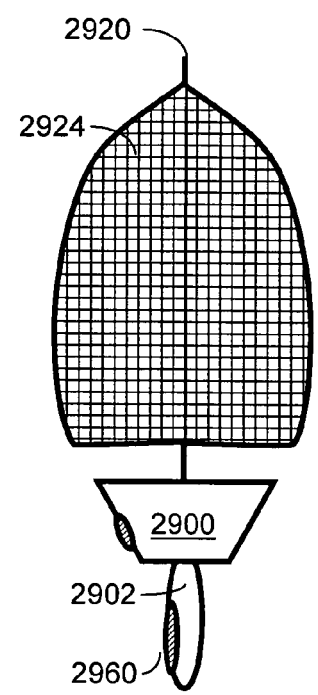
FIG. 29    FIG. 30
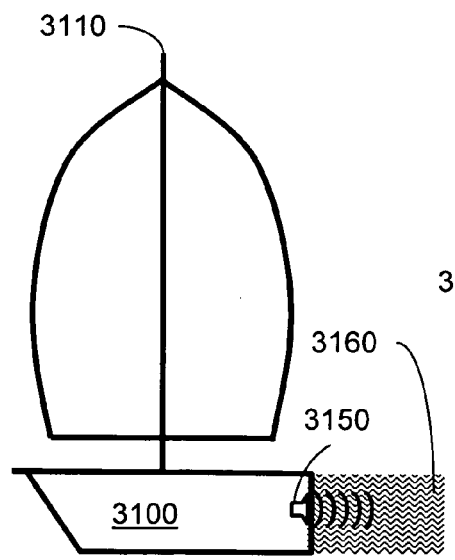
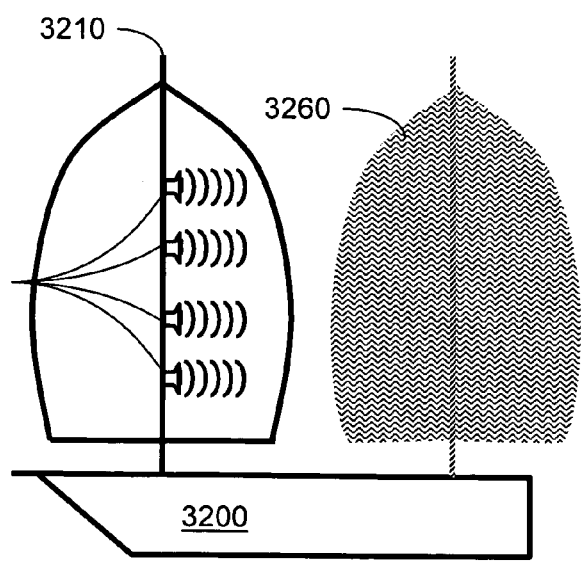
FIG. 31    FIG. 32

TRACTION CONTROL SYSTEM

CROSS-REFERENCE TO RELATED APPLICATIONS

This is a continuation of U.S. patent application Ser. No. 10/893,513 entitled Active Drag and Thrust Modulation System and Method filed Jul. 16, 2004, now U.S. Pat. No. 6,978,767, which is a divisional of U.S. patent application Ser. No. 10/386,992 entitled Active Drag and Thrust Modulation System and Method filed Mar. 12, 2003 (now U.S. Pat. No. 6,793,177 issued Sep. 21, 2004), which is a continuation in part of U.S. patent application Ser. No. 10/287,379 entitled Active Drag Modulation System and Method filed Nov. 4, 2002 (now U.S. Pat. No. 6,824,108 issued Nov. 30, 2004).

FIELD OF THE INVENTION

This invention relates to the field of vehicles utilizing thrust and experiencing drag traveling through an environmental media, and more particularly the modification of thrust, turbulence and drag.

BACKGROUND OF THE INVENTION

Supercavitation occurs when an object moving through water reaches speeds in excess of 100 knots. At this speed it is possible for a bubble of air to form around the object, beginning at the nose of the object. The bubble can extend completely around the entire object and hence the object is no longer moving through the water, rather the object is moving through air. This results in a significantly reduced amount of friction or drag. Hence, supercavitation allows a craft to travel at a high speed on or below the surface of the water with a significant reduction in drag.

When a supersonic airflow passes over a wedge, a shock wave forms at the point of the wedge. This kind of shock wave is called an oblique shock because it forms at some non-orthogonal angle to the surface of wedge (a shock wave perpendicular to the surface is known as a normal shock). As the Mach number increases, the shock angle becomes smaller. Therefore, the distance between the wedge surface and the shock decreases with increasing speed. For a hypersonic body, this distance can become very small over a large portion of the body, and the resulting flow field between the surface and shock is often referred to as a shock layer. The shock layer may merge with the boundary layer at low Reynolds numbers to form a fully viscous shock layer. At high Reynolds numbers, the shock layer can be treated as inviscid (meaning there is no friction). In the limit as Mach number goes to infinity, the shock layer forms an infinitely thin, infinitely dense sheet, or, essentially, a flat plate. The infinite flat plate is the most efficient lifting surface at hypersonic velocities.

Because air is viscous at sub-sonic speeds, any object moving through it collects a group of air particles which it pulls along with it. A particle directly adjacent to the surface of the object will be pulled along at approximately the speed of the object due to viscous adhesion. As an airfoil moves through a free stream of air at a given velocity, this effect causes a very thin layer of air having velocities below that of the free stream velocity, to form upon the airfoil surface. This layer, known as the "boundary layer", constitutes the interface between the airfoil and its surrounding air mass. Conceptually, the boundary layer may be thought of as the layer of air surrounding an airfoil in which the velocity of the layer of molecules closest to the airfoil is at or near zero with respect to the airfoil, and in which the velocity at successively distant points from the airfoil increases until it approaches that of the free stream, at which point the outer limit of the boundary layer is reached. Generally, boundary layers may be thought of as being one of two types, laminar or turbulent, although there is a region of transition between laminar and turbulent that may, in some cases, be quite large. See FIG. 1 and U.S. Pat. No. 4,802,642 to Mangiarotty which is hereby incorporated by reference. A third condition, in which the boundary layer is "unattached", must also be recognized. A laminar boundary layer is typified by smooth flow that is free from eddies. Conversely, turbulent flow is characterized by a thicker boundary layer that has a large number of eddies that act to transfer momentum from the faster moving outer portions to the relatively slower portions nearer the airfoil surface. Consequently, a turbulent boundary layer has a greater average velocity near the airfoil surface, and a correspondingly greater amount of surface friction, than does a laminar boundary layer. The increase in surface friction causes increased aerodynamic drag that requires greater power consumption to maintain constant airfoil speed.

Typically, a laminar boundary layer will form at or near the leading edge of a conventional airfoil and extend rearward toward the points of minimum pressure on the upper and lower surfaces. According to Bernoulli's principle, the region between the leading edge and the first minimum pressure point is one of a decreasing pressure gradient. Thereafter, the pressure gradient will increase and the relatively low kinetic energy of the air molecules closest to the airfoil surface may be insufficient to maintain laminar flow against the gradient. In this event it is possible that small perturbations in the boundary layer will develop into eddies that initiate a transition from laminar to turbulent flow. Alternatively, in the presence of higher pressure gradients, the molecules closest to the airfoil surface may actually reverse their direction of motion and begin to move upstream, thereby causing the boundary layer to separate from the airfoil surface. This condition causes significantly more drag, and less lift, than a turbulent boundary layer, and reattachment will not normally occur unless some means is employed to reenergize the boundary layer. The problem, then, is to develop means to control the boundary layer of an airfoil in order to reduce aerodynamic drag and the energy losses associated therewith.

Prevention of the transition from laminar flow to turbulent flow in aerodynamic boundary layers on the surfaces of vehicles is an important method for reducing aerodynamic drag, and hence reducing energy consumption. The invention herein utilizes acoustic energy to increase the incidence of laminar flow. The use of acoustical methods for total or local control of laminar flow is potentially more economical in energy consumption, and also involves simpler and lighter installations than are required for other systems.

In other instances it is desirable to increase drag, for example during vehicle braking. While some aircraft have movable control surfaces that increase drag and lift, movable control surfaces on other vehicles such as automobiles or boats become impractical. Movable control surfaces add considerable weight, cost and complexity to the design of a vehicle, which may nevertheless benefit from increases in drag in certain applications. Aerodynamic drag may be increased by disrupting laminar flows with acoustic energy. Selective radiation of acoustic energy creates a turbulent flow event on a leading aerodynamic edge where an otherwise low drag laminar flow would be present. This disruption of laminar flow with acoustic energy thereby increases vehicle drag. Thus, what is needed is a drag modulation system that uses acoustic energy to increase or decrease an amount of vehicle drag in response to various usages of the vehicle.

A more recent technology involving directional sound has developed as part of an attempt to reproduce sound without use of a moving diaphragm such as is applied in conventional speakers. This sound propagation approach includes technologies embodied in parametric speakers, acoustic heterodyning, beat frequency interference and other forms of modulation of multiple frequencies to generate a new frequency.

In theory, sound is developed by the interaction in air (as a nonlinear medium) of a modulated ultrasonic frequency whose modulation component in value falls within the audio range. The nonlinear characteristics of air under these conditions results in a mixing of the ultrasonically modulated signal at a physical point of contact. The mixing result is the demodulated audio component of the signal. Ideally, resulting compression waves would be projected within the air as a nonlinear medium, and would be heard as pure sound. An interesting property of parametric sound generation is enhanced directionality afforded by the highly directional ultrasonic carrier.

Ultrasonic acoustic energy may be the acoustic energy used to increase and decrease vehicle drag. Ultrasonic energy has the advantage in that the acoustic energy is beyond the hearing range of most individuals, and is thus a quiet mode of drag control. Ultrasonic transducers are tuned to operate efficiently in a relatively narrow frequency range and are typically precluded from being effective at generating frequencies low enough to be heard as audio signals. Since in many applications, it is desirable for a vehicle to emit an audio alert, such as a horn or other warning sound, what is needed is a method and device for both silently modulating the drag of a vehicle and for generating an audio alert when appropriate.

Aerodynamic drag may also be affected by surface properties. A rough surface disrupts laminar flow while a smooth surface facilitates laminar flow. Since in various applications it is desirable to either increase or decrease drag, what is needed is a method or device for dispensing a substance or chemical that modifies the surface characteristics of an aerodynamic surface.

Aircraft often experience crosswinds that are tangential winds that have various lift and drag effects. Crosswind results in difficulty in controlling the flight of an aircraft and in providing a comfortable environment for aircraft passengers. Thus, what is needed is a method of modifying the lift and drag of the aircraft in response to the crosswinds.

A slipstream is the turbulent flow of air or water driven backwards by propellers of a craft. A slipstream is also the area of reduced pressure or forward suction produced by immediately behind a fast-moving object as it moves through the air or water. There are a number of ways to affect the slipstream boundary layer or laminar airflow layer either in front or behind the vehicle in order to decrease the turbulence or flow. For example, if three vehicles traveling together in a slipstream with one following another one, all vehicles will travel faster. Thus, it is desirable to improve the slipstream to improve this effect and further to facilitate a virtual vehicle traveling in the slipstream.

Other components of crafts are desirable at certain times and under certain conditions. For example, it may be desirable to lengthen the hull of a sailing ship to increase thrust. It may be desirable to generate an additional control surface or wing of an air craft under certain conditions. Thus, what is needed is a way to create virtual components when needed without creating an actual three dimensional component.

In a multiple mast sailing ship, one mast and sail creates a slipstream. Another mast and sail may be traveling in that slipstream. However, the sails of the multiple masts typically have identical surfaces which are not adapted to take advantage of the slipstream. Thus, what is needed is a sail having surfaces adapted to take advantage of the slipstream.

The thin sails of a sailing ship do not take full advantage of various aerodynamic flows at various operating conditions of the ship because the sails are thin. Thus, what is needed is a sail that may be selectively thickened in response to various sailing conditions.

Keels of sailing ships are typically fixed and unable to modify their hydrodynamic characteristics in response to various sailing conditions. Thus, what is needed is a keel that has modifiable hydrodynamic characteristics.

Internal combustion engines are typically used to generate vehicle thrust. An important component of efficient combustion of an air/fuel mixture in an internal combustion is atomization of the fuel with the air. Since the fuel is mixed with the air at a time very close to the time of combustion, it is important that the atomization process occur quickly. Furthermore, turbulent airflows prior to combustion can disadvantageously cause the fuel to separate from the air. Thus, what is needed is a method or system for facilitating rapid atomization of fuel when mixed with the air and that further deters the fuel from separating from the air under turbulent conditions.

Vehicle tires are an important component of vehicle thrust. The traction of the tire facilitates acceleration, braking and turning. Warm tires have improved traction, but the traction comes at the expense of tread life. There are times when improved traction is preferable to improved tread life, such as competition driving, and there are times when improved tread life is preferable to improved traction. Furthermore, in some instances heating the road surface itself may improved traction, particularly with there are snow or wet condition. Thus, what is needed is a method or system for selectively heating vehicle tires and/or the road surface contacted by the tires.

SUMMARY OF THE INVENTION

In accordance with the present invention, an aerodynamic surface of a wing travels through an environmental media and experiences drag. The wing or some other part of the vehicle has a substance reservoir that dispenses a first substance for decreasing drag of the wing and a second substance for increasing drag of the wing.

The present invention also relates to a vehicle traveling in a forward direction though an environmental media and moving at least partially in a cross direction perpendicular the forward direction. The vehicle experiences vehicle drag as a result of the environmental media while moving in the cross direction. In order to compensate for this, the vehicle has energy radiators that transmit energy beams in the cross direction. The energy beams modify the drag of the vehicle in the cross direction. A cross velocity of the environmental media may be determined and the energy beams transmitted in response thereto.

In accordance with the present invention, a vehicle travels in a forward direction though an environmental media and experiences vehicle drag as a result thereof. A method comprises the step of modifying the vehicle drag by transmitting an energy beam from the vehicle into the environmental media in the forward direction.

In accordance with the present invention, a vehicle travels through an environmental media and experiences drag as a result of the environmental media. A vehicle device comprises a first energy beam transmitter for transmitting a first energy beam for decreasing the drag, a second energy beam transmitter for transmitting a second energy beam for increasing the drag, and an active drag controller for selectively enabling said first and second energy beams.

In accordance with the present invention, a method comprises the steps of transmitting an ultrasonic signal from a moving vehicle, and selectively modulating the ultrasonic signal with an audio signal.

In accordance with the present invention, a vehicle device comprises a forward facing ultrasonic transmitter for transmitting a forward ultrasonic beam in a forward direction, a rearward facing ultrasonic transmitter for transmitting a rearward ultrasonic beam in a rearward direction, an audio modulator for selectively modulating an audio signal on the forward and rearward ultrasonic beams and a user input receiver coupled to said audio modulator for modulating the audio signal on the forward ultrasonic beam in response to a first user input and for modulating the audio signal on the rearward ultrasonic beam in response to a second user input.

In accordance with the present invention, a vehicle traveling through an environmental media dispenses a first substance for decreasing drag and dispenses a second substance for increasing drag. The first and second substances may be chemical substances dispensed on aerodynamic surfaces of the vehicle.

In accordance with the present invention a vehicle traveling through a crosswind transmits an energy beam from the vehicle in the direction of the crosswind.

In accordance with the present invention a sail for a sailing ship has an aerodynamically rough surface on a first side and an aerodynamically smooth surface on a second side.

In accordance with the present invention a sail comprises a thin sheet and a widening portion for selectively widening the thickness of the sail.

In accordance with the present invention the hydrodynamic characteristics of a keel of a sailing ship may be modified while the sailing ship is sailing.

In accordance with the present invention, atomization of a fuel spray is enhanced by injecting the fuel spray into an air environment and radiating the fuel spray with an energy beam.

In accordance with the present invention, a vehicle tire is selectively heated.

BRIEF DESCRIPTION OF THE DRAWINGS

FIG. 19 shows a sailing ship with two masts having sails adapted in accordance with the present invention.

FIG. 20 shows a cross sectional view of a first selectively modifiable sail in accordance with the present invention.

FIG. 21 shows a cross sectional view of a second selectively modifiable sail in accordance with the present invention.

FIG. 24 shows a sailing ship with a keel having variable flow characteristics using a variable vertical area in accordance with the present invention.

FIG. 25 shows a sailing ship with a keel having variable flow characteristics using a variable horizontal area in accordance with the present invention.

FIG. 26 shows a sailing ship with a keel having variable flow characteristics using an energy beam emitted from the keel in accordance with the present invention.

FIG. 27 and FIG. 28 show front and top views of an aircraft having expandable wing sections in accordance with the present invention.

FIG. 29 and FIG. 30 show side and rear views of a sailing ship having selectively heated portions in accordance with the present invention.

FIG. 31 shows a sailing ship with an enhanced virtual waterline in accordance with the present invention.

FIG. 32 shows a sailing ship with a virtual sail in accordance with the present invention.

FIG. 33 shows an aircraft having a virtual wing in accordance with the present invention.

DETAILED DESCRIPTION OF THE INVENTION

Figure 1:
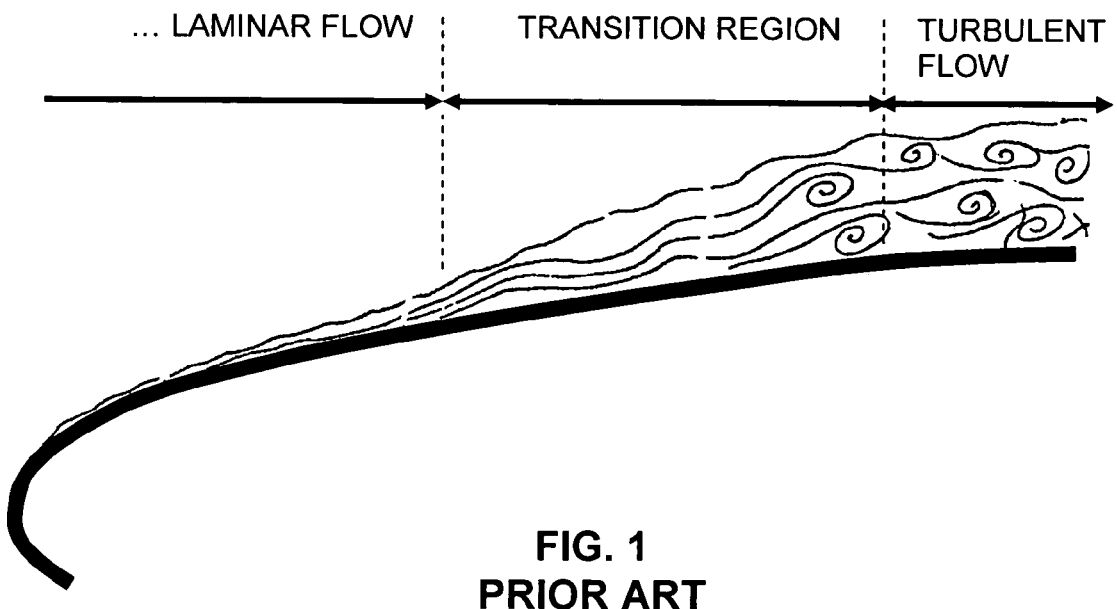
FIG. 1 shows a prior art airfoil section showing laminar flow, transition and turbulent boundary layers.

FIG. 1 illustrates a typical lifting aerodynamic surface having a laminar flow boundary layer. Thin laminar boundary layer flow is observed in the laminar flow region from the leading edge to a point at which transition begins. The beginning of the transition region is characterized by a thickening of the boundary layer and the appearance of small eddying perturbations in airstream velocity. As the airstream progresses through the transition region, certain airflow disturbances within a range of predictable oscillatory frequencies, known as Tollmien-Schlichting waves, become amplified to form eddies that cause a transfer of momentum from the higher energy air near the outer surface of the boundary layer to the low energy air at the surface. At this point the airstream enters the turbulent region, being comprised of many large eddies and characterized by a relatively higher average velocity near the airfoil surface. The higher velocity creates greater surface friction with the airfoil which is evidenced as an increase in aerodynamic drag.

Mathematical analyses done by W. Tollmien in the early 1930s resulted in the publication of a theory of the stability of laminar motion in the boundary layer near a thin flat plate in an airstream flowing parallel to the plate. The calculations were repeated and extended by H. Schlichting in 1933 and 1935, and were confirmed experimentally in 1941 by Schubauer and Skramstad. The theory predicted that a range of small disturbances or perturbations in the velocity of a laminar airstream would, in mathematically identifiable regions, take on an oscillatory motion, or mode, that would become amplified until laminar flow was broken down. Disturbances occurring outside such identifiable regions would become damped. The regions in which amplification occurred were defined as a function of Blasius velocity distribution and Reynolds number, and experimental data conformed closely to the mathematically predicted phenomena. Schubauer and Skramstad's experimental data also confirmed that the frequency of the amplified oscillations, known as Tollmien-Schlichting, or T-S, waves, fell within a relatively narrow frequency bandwidth.

In experiments conducted jointly by The Boeing Company and the National Aeronautics and Space Administration in late 1985, T-S mode frequencies were calculated for the wing boundary layers for a Boeing 757-200 commercial transport. These predicted T-S frequencies were then confirmed experimentally from flight test data measured with hot film sensors on the surfaces of the airplane wing. The predicted and experimentally verified T-S frequencies were in the range of 100 to 6000 Hz, varying as predicted with wing location, flight altitude, and speed.

Other research has confirmed that Tollmien-Schlichting waves are responsive to external acoustical excitation. The application of acoustic energy having frequencies within the range of the characteristic critical wavelengths of T-S waves has been shown to enhance the amplification of T-S waves. It has also been found that external acoustic excitation of a laminar boundary layer within a frequency band slightly wider than the T-S waves in the laminar flow to be controlled causes a delay in the amplification process of T-S waves. This occurs when the wavelengths of the acoustic disturbances are in the same range as the T-S wavelengths and interact with the T-S waves in a time-phase relationship to delay amplification of disturbances in the laminar flow.

A third regime in which T-S waves are affected by external acoustic excitation is found at frequencies substantially higher than the T-S wave critical frequencies, that is, at wavelengths substantially shorter than the T-S critical wavelengths. In this case, acoustic disturbances impinging on the laminar flow interfere destructively with the growing T-S waves. Acousting excitation sufficient to destructively interfere with T-S waves must contain frequencies at least twice as high as the highest of the T-S critical frequencies. It is within this third regime that the invention herein finds an exemplary embodiment.

Figure 2:
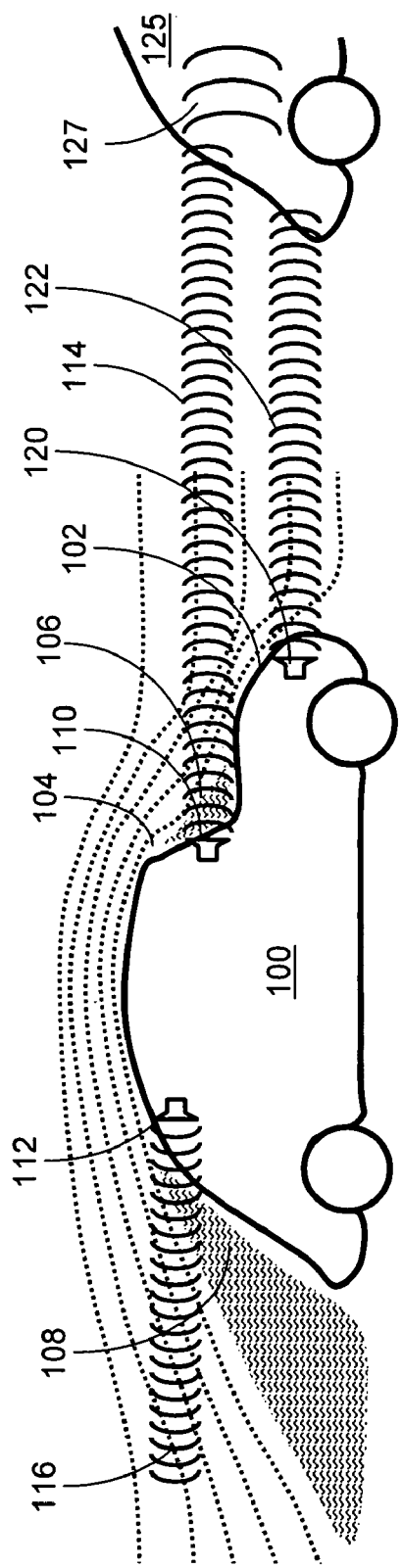
FIG. 2 shows a vehicle with ultrasonic active drag modulation and acoustic alerts in accordance with the present invention.

FIG. 2 shows a vehicle with ultrasonic active drag modulation and acoustic alerts according to the present invention. Vehicle 100 has laminar flow regions on its leading edge bumper 102 and roof 104 and turbulent regions above the hood 106 and aft 108. Ultrasonic radiators 110 and 112 radiate ultrasonic energy beams 114 and 116 respectively into the transition areas between laminar flow 102 and turbulence 106 and laminar flow 104 and turbulence 108. As previously described the ultrasonic energy beams 114 and 116 provide an acoustic disturbance that decreases drag. Transducer 120 produces an ultrasonic energy beam 122 in the laminar flow region 102, preferably at the leading edge or bumper of the vehicle 100. Ultrasonic energy beam 122 disrupts the laminar flow and increases drag when activated.

Vehicle 100 can be an automobile having no active fins or wings or other moving components to modify the drag of the vehicle. Nevertheless, the drag of vehicle 100 can be actively modulated relative to the static drag produced by the body the vehicle. The drag of the vehicle is reduced by energy beams 114 and 116 and the drag of the vehicle is increased by energy beam 120. Thus, a control system such as the control system of FIG. 4 may be used to actively modulate the drag of the vehicle by selectively transmitting energy beams 114, 116 and 122.

The ultrasonic energy beams have the further advantage of providing the modulation of drag without moving control surfaces and while maintaining a quiet environment. The quiet environment is the result of the high frequency ultrasonic energy beam being beyond the hearing range of vehicle occupants and pedestrians. However, there are instances during the operation of the vehicle where it is desirable to provide audio alerts to other vehicles ahead or behind. This alert is typically provided by a horn generating a substantially omni directional audio warning. However, often times the warning is intended only for those in front or behind the vehicle. For example, if a vehicle ahead remains stopped at a green light then a forward alert would be appropriate. Similarly, a vehicle behind should be cautioned of a sudden application of the brakes by a rearward warning. Ultrasonic energy beams 114, 116 and 118 have the further advantage of operating as a parametric array and are capable of precisely generating audio alerts in areas ahead and behind the vehicle due to the directional nature of the ultrasonic energy beam.

FIG. 2 also shows that forward facing ultrasonic energy beams 114 and/or 122 are further modulated with an audio signal. When these ultrasonic energy beams reach the vehicle 125 located ahead of vehicle 100, an audio signal 127 is generated, sounding as if the audio signal originates in the area of contact of energy beams 114 and/or 122 with vehicle 125. Since the ultrasonic beams are highly directional, this provides for highly directional and potentially individualized communications from vehicle 100 to vehicle 125. Furthermore, since the rear of most vehicles such as vehicle 125 include a significant complement of glass which is substantially acoustically transmissive, and since the audio component of the alert could sound as if it is originating at the glass, the operator inside of vehicle 125 will likely be able to clearly hear the alert even if exterior noise elimination approaches are taken in the design of the vehicle to quiet the interior of the vehicle. The occupants of vehicle 125 will hear the alert as if it were originating at the rear glass of vehicle 125. Furthermore, vehicles adjacent to vehicle 125 will likely not hear or hear a substantially quieter alert signal because of the directionality of the ultrasonic energy beams 114 and 122 and the natural attenuation characteristics of audio. Similarly, energy beam 126 may be used to communicate alert signals to a vehicle behind vehicle 100.

Figure 3:
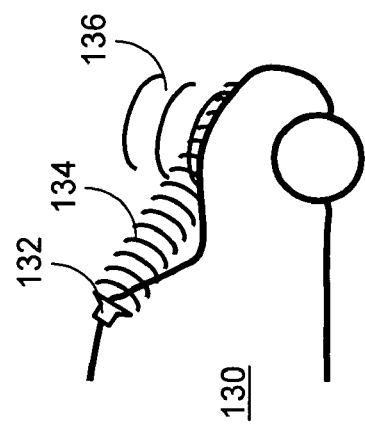
FIG. 3 shows an alternate embodiment of a vehicle with ultrasonic active drag modulation in accordance with the present invention.

FIG. 3 shows an alternate embodiment of a vehicle with ultrasonic active drag modulation. In FIG. 3 vehicle 130 has a transducer 132 situated such that an ultrasonic beam strikes an area of the vehicle where the airflow is transitioning from laminar to turbulent. In this embodiment, acoustic energy 136 occurs at the transition area even though there is no transducer located at the transition area. Acoustic energy represents the mixing products resulting from a modulated signal transmitted by the parametric array, or the acoustic energy generated by the transducer and reflected by the vehicle body. Note the modulated signal may have either audio or ultrasonic frequency component. This alternate embodiment has the advantage of allowing for the occurrence of acoustic energy at the transition region without locating a transducer at the transition region.

Figure 4:
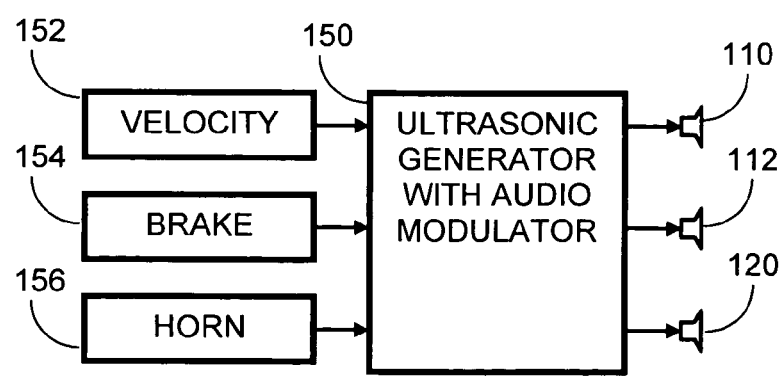
FIG. 4 shows a block diagram of the ultrasonic active drag modulation system with acoustic alerts in accordance with the present invention.

FIG. 4 shows a block diagram of the ultrasonic active drag modulation system with acoustic alerts. Acoustic transducers 110, 112 and 120 are driven by ultrasonic generator and audio modulator 150. While three transducers are shown, the invention is not limited to three transducers. Any number of transducers are may be used in any number of various vehicle locations in realizing the purposes of the invention. Each of the transducers, although shown as a single device, may be an array of transducers or other arrangement known to those familiar with the art that result in the transmission of ultrasonic or other form of acoustic energy.

The ultrasonic generator includes amplifiers for driving the corresponding transducers with an ultrasonic signal. The ultrasonic generator further includes an ultrasonic carrier signal for setting the frequency of the ultrasonic beam transmitted by the transducers. The ultrasonic generator also includes an audio modulator for modulating the ultrasonic carrier signal. Preferably the ultrasonic carrier signal is amplitude modulated with the audio signal. For example, the ultrasonic signal could be set at 50 kHz and the audio signal set at 1 kHz. If no sound were desired for the ultrasonic beam, then it would be unmodulated. If on the other hand, a 1 kHz audio signal were to be generated then the 50 kHz signal would be amplitude modulated with a 1 kHz signal. Other forms of carrier modulation are anticipated including amplitude, frequency and quadrature modulation.

One input to the ultrasonic generator includes the velocity 152 of the vehicle. If the vehicle is traveling at a sustained speed, then transducers facilitating drag reduction are engaged. If the vehicle is decelerating then transducers facilitating drag enhancement are engaged. The ultrasonic signal may be either modulated or unmodulated depending on various other inputs to the ultrasonic generator. Furthermore, the carrier or modulation frequency may be adjusted with respect to the velocity. For example, in the embodiment of FIG. 3, the modulation (or carrier) frequency may be adjusted in response to the T-S frequency corresponding to the vehicle speed. Alternatively, all transducers of the invention may be modulated with a frequency in response to the T-S frequency corresponding to the vehicle speed.

A second input to the ultrasonic generator is the brake 154. When the user applies the brake, the drag of the vehicle is increased by activating and deactivating the appropriate transducers. For example, transducer 120 is enabled and transducers 110 and 112 are disabled. If a rearward alert is to be generated, then transducer 112 could remain activated for the duration of the alert. The alert could be a short warning tone, substantially one or more seconds in duration, directed to the rear of the vehicle. Alternatively, the alert could be any audio signal, such as the word "warning" or "brakes" or combinations thereof. Since the alert is modulated upon an ultrasonic carrier, it will substantially only be heard by listeners directly behind the vehicle. Upon completion of the alert, transducer 112 is deactivated to facilitate the slowing of the vehicle by transducer 120.

A third input is the horn 156. Upon sounding the horn, both forward transducers 110 and 120 are activated and the corresponding audio signal modulated there upon. Turning both transducers on increases the audio energy received by vehicle 125. The audio signal is preferably the sound of a conventional car horn and will substantially only be heard by listeners directly in front of the vehicle. Alternately, the audio signal can be any desired audio signal. Furthermore, if only a transducer for drag reduction or enhancement is enabled, then the audio signal may be modulated only upon that transducer without activating the other transducer. Thereby providing the audio signal to the vehicle ahead while maintaining the desired drag reduction or enhancement.

It should be appreciated that other inputs and other audio signals may be used-while remaining within the scope of the invention. For example, the audio component could be coupled to a microphone and a representation of the voice of a vehicle occupant communicated to a vehicle ahead. The vehicle ahead could have a similar system and use the rearward transducer coupled to a microphone, thereby facilitating substantially private conversations between occupants of the traveling vehicles. This communication may be done while facilitating drag modulation with the ultrasonic energy carrier signals.

Figure 5:
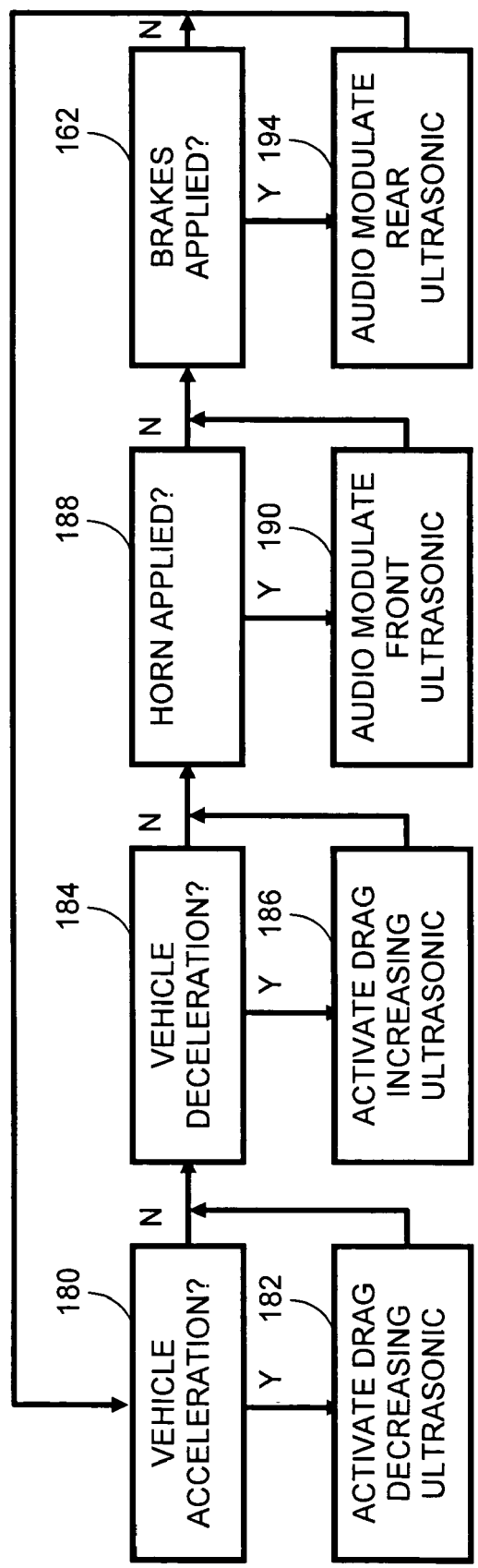
FIG. 5 shows a flow diagram of the operation of the ultrasonic generator and audio modulator of FIG. 4 in accordance with the present invention.

FIG. 5 shows a flow diagram of the operation of the ultrasonic generator and audio modulator of FIG. 4. Step 180 determines if the vehicle is to accelerate or if it is cruising at a sustained velocity, if cruising then ultrasonic transducers that actively reduce the drag are enabled at step 182. Step 184 determines if the vehicle is to decelerate, if so then ultrasonic transducers that actively increase and thereby enhance the drag are enabled at step 186. Step 188 determines if the vehicle horn is applied, if so then a manual signal from an occupant of the vehicle is received (such as the operator activating the horn switch) and the front ultrasonic transducers are enabled with ultrasonic signals carrying audio modulation at step 190. Step 194 determines if the vehicle brakes are applied, if so then a manual braking signal from the operator of the vehicle is received (such as the operator applying the brake pedal) and the rear ultrasonic transducers are enabled with ultrasonic signals carrying audio modulation at step 194.

As a further example, vehicle drag modulation may be used in automotive racing applications where the amount of weight or downward force applied to various tires of a race vehicle may be varied depending upon various applications to the vehicle. Drag modulation may be independently performed for an area above each tire by placing transducers accordingly. For example, the drag on the front wheels may be increased while the vehicle is going into a turn to facilitate front tire traction during the beginning of the turn. Alternately, drag on the rear wheels may be increased coming out of a turn to facilitate improved acceleration traction coming out of the turn. On a straight section of track drag may be decreased to improve speed or modulated to provide sufficient tire force on the ground to maintain control of the vehicle. The transducers may be located in the appropriate areas as shown in FIG. 2, or remotely located as shown in FIG. 3. These features may be advantageously accomplished without complicated moving parts such as fins or control surfaces and may be done under computer control, without significant driver intervention.

Figure 6:
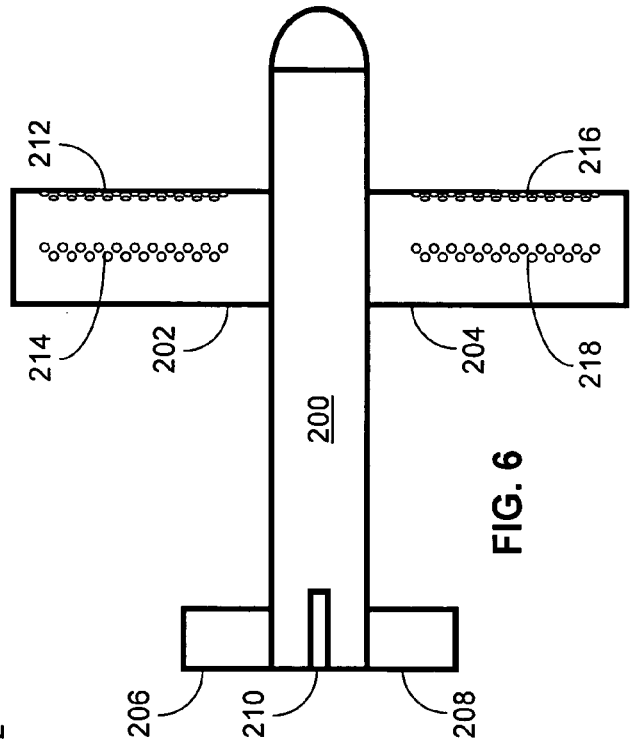
FIG. 6 shows a top view of an aircraft with active drag modulation in accordance with the present invention.

FIG. 6 shows a top view of an aircraft with active drag modulation in accordance with the present invention. The aircraft has left and right forward wings 202 and 204, left and right rear wings 206 and 208 and a tail 210. Each wing has a first ultrasonic transducer for transmitting an energy beam that increases drag and a second ultrasonic transducer for transmitting an energy beam that decreasing drag. Wing 202 has ultrasonic transducer 212 facing forward for disrupting laminar flow thereby increasing or enhancing drag and ultrasonic transducer 214 located in the transition zone between turbulent and laminar flow regions for reducing drag. Similarly, wing 204 has ultrasonic transducer 216 facing forward for disrupting laminar flow thereby increasing or enhancing drag and ultrasonic transducer 218 located in the transition zone between turbulent and laminar flow regions for reducing drag.

The drag on the forward wing can be increased by transmitting ultrasonic energy beams from forward transducers 212 and 216, while the drag on the forward wing can be decreased by transmitting ultrasonic energy beams from transducers 214 and 218. Rear wings 206 and 208 may have similar transducers situated there upon for producing similar drag modulation thereupon.

Figure 7A:
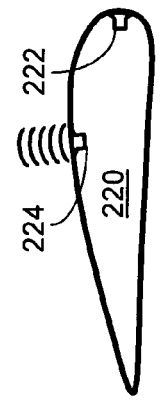
FIG. 7A shows a cross sectional view of a wing with a drag reduction transducer activated in accordance with present invention.

FIG. 7A shows a cross sectional view of a wing with a drag reduction transducer activated. Wing 220 has forward transducer 222 deactivated and transducer 224 activated. Transducer 224 is located in the transition region between turbulent and laminar flows.

Figure 7B:
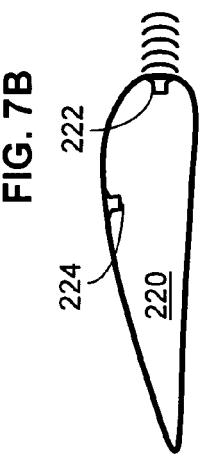
FIG. 7B shows a cross sectional view of a wing with a drag enhancement transducer activated in accordance with the present invention.

FIG. 7B shows a cross sectional view of a wing with a drag enhancement transducer activated. Wing 220 has forward transducer 222 activated and transducer 224 deactivated. Transducer 224 is located on the leading edge of the laminar flow.

Figure 8A:
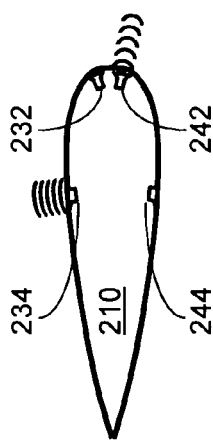
FIG. 8A shows a cross section of a tail with drag reduction on the left side and drag enhancement on the right side in accordance with the present invention.

FIG. 8A shows a cross section of a tail with drag reduction on the left side and drag enhancement on the right side. Tail 210 has left forward transducer 232 deactivated and transducer 234 activated. Transducer 234 is located in the transition region between turbulent and laminar flows of the left side of the tail. Furthermore, tail 210 has right forward transducer 242 activated and transducer 244 deactivated. Transducer 244 is located on the leading edge of the laminar flow of the right side of the tail. Thus, the tail of FIG. 8A has drag reduction on the left side and drag enhancement on the right side.

Figure 8B:
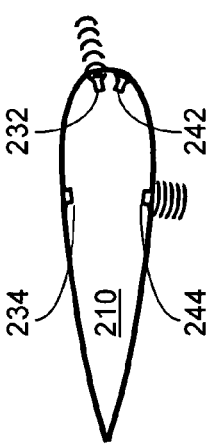
FIG. 8B shows a cross section of a tail with drag reduction on the right side and drag enhancement on the left side in accordance with the present invention.

FIG. 8B shows a cross section of a tail with drag reduction on the right side and drag enhancement on the left side. Tail 210 has right forward transducer 242 deactivated and transducer 244 activated. Transducer 244 is located in the transition region between turbulent and laminar flows of the right side of the tail. Furthermore, tail 210 has left forward transducer 232 activated and transducer 234 deactivated. Transducer 234 is located on the leading edge of the laminar flow of the left side of the tail. Thus, the tail of FIG. 10 has drag reduction on the right side and drag enhancement on the left side.

The transducers of FIG. 6-FIG. 8B may be independently activated by a control system similar to the control system of FIG. 4 but adapted for aircraft applications. For example, activation of transducers 214 and 216 will reduce drag on the left wing while increasing drag on the right wing. Similarly activation of transducers 212 and 218 will increase the drag on the left wing while decreasing the drag on the right wing. Similar controls may be performed on the rear wings. The ability to actively change the drag on each wing facilitates control of the aircraft. Similarly, the ability to actively change the drag on the left or right side of the tail further facilitates flight control of the aircraft. Thus, this system of active drag modulation has the advantage of facilitating flight control without moving control surfaces.

The magnitude of drag modulation can be controlled by modifying the frequency or energy of the energy beam transmitted by the transducers. Furthermore, the transducers are preferably an array of transducers. For example, transducers 212–218 are each comprised of a multiplicity of transducers. The magnitude of the drag modulation may be increased or decreased by enabling more or less of the multiplicity of transducers in each array. Rear wing and tail transducers 232–244 may be comprised of similar arrays of multiple transducers. While the invention is described in the context of ultrasonic acoustic energy, other forms of acoustic energy are also anticipated, such as audio energy modulated at frequencies resulting in the described drag modulations. Furthermore, alternate types of energy beams are anticipated, such as electromagnetic energy beams such as microwave, infrared and visible lasers.

It should be further appreciated by those familiar with the art that similar principles may be applied to boats or other water craft. The active drag modulation may be similarly performed in water and affect the drag experienced by the hull of a ship.

In other embodiments, pulsed ultrasound can create a waveform in front of a moving object such as a car, airplane, boat or train by pulsing an ultrasonic wave in front of the moving object to create a waveform. The moving object would follow into this waveform. The waveform could further create a cavity or lower drag environment for object to travel within.

Currently, a vehicle cuts the water or air in front of it. This causes a friction. The friction or drag may be caused by any type of environmental media including air and water. A waveform could create a pulsed envelope providing something that does not have returning reactive force. This could create vacuum or vacuum like condition within which the vehicle would travel, resulting in decreased frictional resistance and improved efficiency such as fuel efficiency and/or glide range.

This can be used to assist the wing and lift on an airplane, or a boat in terms of making it easier to plane. Furthermore, this can be used to facilitate travel of a bullet or other projectile or moving object within the ultrasonic beam. The beam could be a continuous wave ultrasound or could be a pulsed ultrasonic wave creating a wave. The beam could be linked to the speed of the moving object so that the greater the speed, the faster the impulses or the more energy created impulses or further heavy impulses would form.

Throughout the description herein, alternate forms of energy beams could also be used such as a laser to heat the air or to break the air or water. Alternate forms of contemplated energy beams further include electric pulse signals, pulsed air, piezoelectric, infrared, ultraviolet, laser, optical band, microwave, thermal other known acoustic, electric, optical, or other electromagnetic energy and any combination thereof. Such energy beams would create heat or a pulsed wave pattern where the wing or the wedge of the moving object would head into.

This could be a constant or pulsed energy beam and adjusted for the speed and/or vertical lift, frequency, density, angle, pulse and wavelengths experienced by the vehicle. The combination of energy can be computer controlled and sequenced or coordinated with the incoming air and/or fluid, direction of the wind and/or cross wind. It would have applications for all types of vehicles or moving objects.

The energy beam can also be placed in the rear of the vehicle to improve the efficiency by decreasing the turbulence behind the vehicle to improve efficiency. The basic concept of a slipstream is that a vehicle traveling in the slipstream created by a turbulent area behind a leading vehicle allows the vehicle traveling in the slip stream to travel more efficiently. This utilizes the principles of another object in front of a vehicle cutting the water/air to create negative pressure resulting a mass or air traveling at substantially the same speed of the second vehicle located ahead of the second vehicle. This slip steam could again be created with this pulsed or continuous wave pattern which could be pulsed ahead of the vehicle by the energy beams. This generally could be used for a number of applications including weapons such as projectiles, missiles or space based objects.

These energy beam projectors such as ultrasound can be very inexpensive. There can be multiple projectors placed across the front of the vehicle or along the sides of the vehicle, or in front of the airplane or along the wings. It could also be placed in the front and the back, it could be different wavelengths depending on the location relative to the vehicle and project different wave lengths depending on the speed and energy again related to the speed density of the air and whether there is a cross current or crossing fiber. The location of this could be adjusted if, for example, there is wind at a 45° angle to the front. The angle of these ultrasonic beam generators could change to go more directly into the direction of the wind being broken into or the waves which are beating against the boat, for vehicle resulting in increased friction or drag.

There are additional embodiments and operating modes contemplated herein. All operating modes described hereinafter, to the extent possible, may be incorporated into the prior description in order to enhance the prior described invention.

Energy directors or radiators may be described as ultrasound, microwave and infrared. Such energy directors can be placed on leading edges or on the trailing edges of wings or other traveling surface. Furthermore, energy directors can be placed on the side, and may consist of multiple transducers. The surface can be coated with piezoelectric crystals. This could be placed in the skin. These crystals are oscillating back and forth by exciting positive and negative currents to excite and airfoil to change the boundary level. This results in oscillating the piezoelectric skin. The multiple piezoelectric crystals could be bonded to the surface, or could be in specific areas.

The energy radiators can be ultrasonic energy or microwave energy, or otherwise and the power for the energy beam can be generated from the vehicle. Once the vehicle starts moving it creates electrical energy that can be used for the energy radiator. This can be a self contained unit. Additional batteries or other power sources may not be entirely needed. Once the speed of an internal combustion engine increases, they can self feed the energy to these generators as a self contained unit. Once motion occurs, the energy created by the engine and by the vehicle can create an electric energy which can be converted for the ultrasonic microwave generators rather than having to have separate generators for them. As the speed increases, the generators become more and more effective and efficient. This can result in a self contained system having alternators to harness this energy, rather than having to build a separate generator or separate power source.

Figure 9:
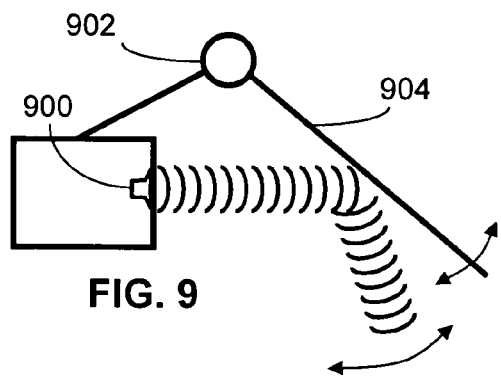
FIG. 9 shows an energy director with variable direction in accordance with the present invention.

FIG. 9 shows an energy director with variable direction in accordance with the present invention. The energy beam radiator 900 is shown as an ultrasonic energy director. In alternate embodiments, the energy beam radiator may be an infrared, microwave, ultraviolet, subsonic, pulsed air, hot/cold enhanced, or other type. A deflector 904 modifies the direction of the radiated energy using a pivot 902. This allows for the energy beam to be directed as desired. The pivot may be controlled by a remote computer and adjusted in response to a wide variety of variables including vehicle speed and acceleration. As previous described, changing the location of the energy beam can modify the drag of the vehicle. In alternate embodiments the pivot 902 can be fixed. In operation, waves bounce off of deflector 904 like a mirror to optimize the direction of the waves.

Figure 10:
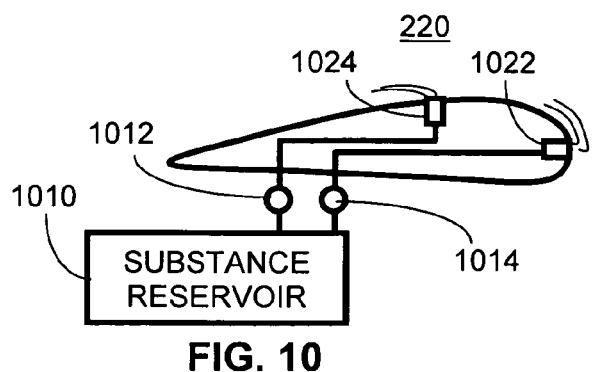
FIG. 10 shows an alternate drag modification method in accordance with the present invention.

FIG. 10 shows an alternate drag modification method in accordance with the present invention. A substance reservoir 1010 stores various chemicals or fluids that are pumped out at various location of the vehicle by pumps 1012 and 1014 in order to modify the drag. The pumps are controlled by an active drag controller (not shown) that operates in a manner similar to the previously described control of active drag modulation. A different substance may be dispensed at each location wherein a first substance may decrease drag by not only extending laminar flow upon the aerodynamic surface but also by providing an atmospheric lubricating substance, and a second substance may not only may disrupt laminar flow by being dispensed at the location of laminar flow but also may add an atmospheric friction enhancing substance to the environmental media. Locations 1022 and 1024 of FIG. 10 correspond to locations of transducers 222 and 224 of the prior figures and also correspond to leading and trailing edge locations of an aerodynamic surface, respectively. One could place a chemical such as surfactant, soaps, or other known materials in the fluid reservoir to decrease cohesion. This may be done constantly while the vehicle is in the air such as an airplane, or a boat so when constantly streamed a small amount of soap or surfactant type materials to improve this boundary layer thereby modifying the vehicle drag.

In alternative embodiments the first and second substances may be the same substance while realizing the aforementioned benefits. An example of a substance which may decrease the drag characteristics of the air around a wing may be soap, and an example of a substance that may increase the drag characteristics of the air around a wing may be a powder. Furthermore, the drag modifiers of FIG. 10 may be used in part or entirely in conjunction with the other drag modification techniques described herein while remaining within the scope of the intended invention.

FIG. 10 shows an aerodynamic surface of a wing 220 traveling through an environmental media and experiencing drag wherein the substance reservoir 1010 dispenses a first substance for decreasing drag of the wing and a second substance for increasing drag of the wing. An active drag controller (not shown) selectively enables dispensing of the first and second substances by producing drag increase and drag decrease signals. The active drag controller may be the controller of FIG. 4 operating a process similar to the process of FIG. 5 adapted for drag increasing or decreasing substances rather than drag increasing or decreasing using energy beam radiation.

In an alternate embodiment, hot and/or cold air can also be used as an energy radiator. Heating surfaces of a wing may enhance lift. A wing surface may be heated with engine exhaust, electric sensors or electric patches on a wing that could selectively be turned on and off. The patches can use the heat from the internal combustion engine to heat an entire surface underneath the wing. This may improve lift and fuel efficiency. Wing heating could be electrically done or thermally done from internal combustion engine using exhaust heat to improve the lift or decrease the lift as necessary. This could be controlled on different surfaces of the wing and be utilized to further enhance efficiency. This could be done with controlled heat or controlled pulsed air. The air may be hot or cold, as required. If the air is cold it may be useful for increasing the density and improving drag during landing. Hot air may improve lifting during flying or during take off. This could improve the efficiency again utilizing the power and the heat and there would be electrical energy generated by an engine to improve its airflow, by using heat from the engine itself or optimizing the energy which is generated by the internal combustion engine.

Figure 11:
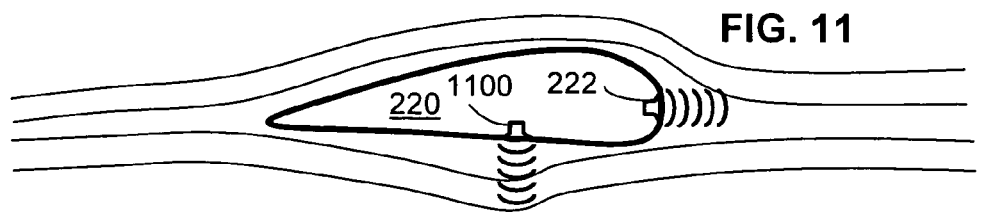
FIG. 11 shows a wing having a front and a bottom energy beam in accordance with the present invention.

FIG. 11 shows a wing having a front and a bottom energy beam in accordance with the present invention. Wing 220 has a front energy beam radiator 222, which may be one or more elements as previously described and a bottom energy radiator 1100, which may be one or more elements. Bottom radiator 1100 can be used to create a pulse pattern below the wing that can assist in increasing the lift of the wing. The front radiator 222 creates a pulse pattern in front of the wing to assist in cutting through the air. A pulse pattern radiated above the wing may decrease lift and aid in landing.

Figure 12:
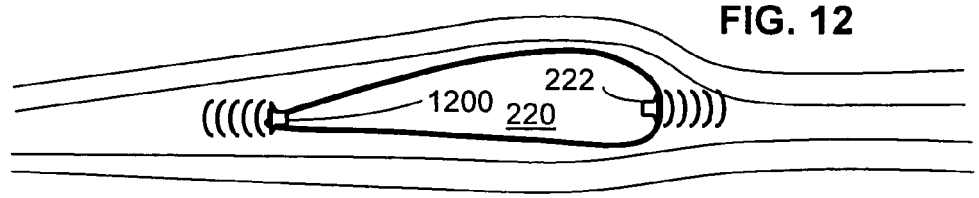
FIG. 12 shows a wing having a front and a rear energy beam in accordance with the present invention.

FIG. 12 shows a wing having a front and a rear energy beam in accordance with the present invention. The rear radiator 1200, which may be one or more elements, can be used to create a pulse pattern behind the wing that can assist in the creation and enhancement of a slipstream behind the wing. The front radiator 222 creates a pulse pattern in front of the wing to assist in cutting through the air. The principle of FIG. 12 may apply to a boat, a car or a plane. Enhancing the slipstream reduces the drag experienced by a vehicle behind the leading vehicle and thus improves the efficiency of moving multiple vehicles through the environmental media. For example, if the slipstream behind a lead vehicle such as a car is enhanced, then the following vehicle will travel more efficiently.

A key feature of FIG. 11 and FIG. 12 includes the idea that a wing with the energy beams of FIG. 11 and FIG. 12 can cut through the air more efficiently, and improve the efficiency of the laminar flow at the boundary layer. Furthermore, a slipstream can be created for other vehicles by modifying the flow of air behind the vehicle. The ultrasonic sensors below the wing and/or behind the wing may continuously radiate or be pulsed to further improve the airflow. This may help in lift and take off or above the wing for landing. The principles herein can be applied to vehicles traveling through environmental media including air and water and other fluids.

Figure 13:
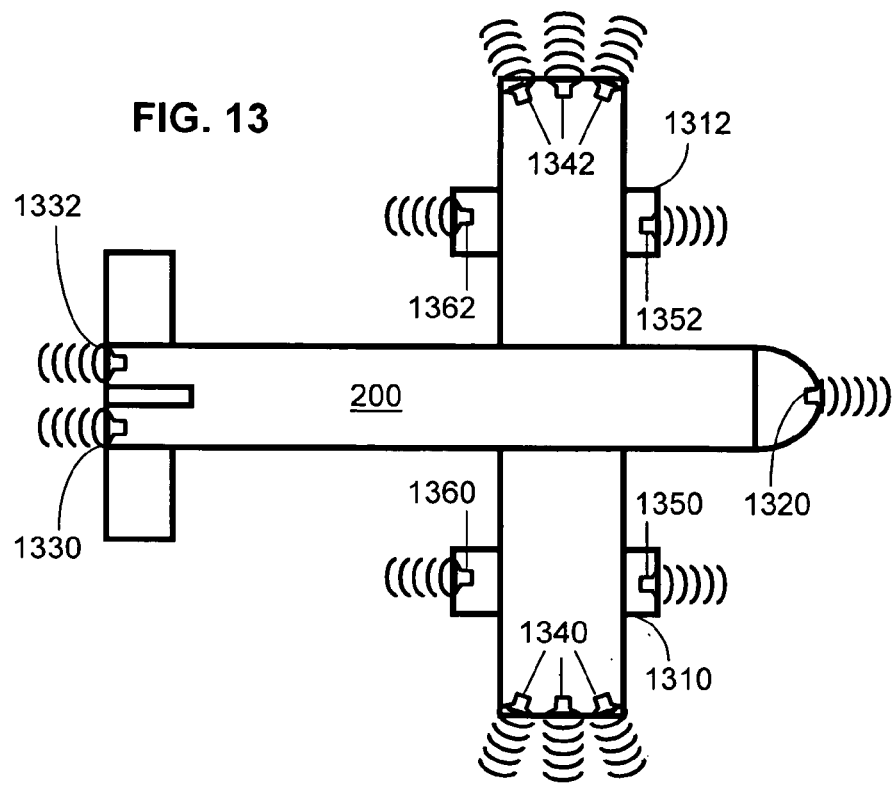
FIG. 13 shows an airplane having additional energy beams located at various locations to enhance the operation of the airplane in accordance with the present invention.

FIG. 13 shows an airplane having additional energy beams located at various locations to enhance the operation of the airplane in accordance with the present invention. The aircraft 200 is similar to the airplane 200 of FIG. 6 and has one or more of the energy beam radiators of FIG. 13 in addition to or in place of the radiators previously discussed. The craft 200 is driven by engines 1310 and 1312 which may be jet engines or propeller based engines. While two engines are shown in this embodiment, other embodiments may have more or less engines and the engines may be located in other locations on the craft including in the tail area of the craft. The radiators assist with the up, down and sideways control of the aircraft. The radiators may be ultrasonic, sonic, laser, infrared or piezoelectric or other radiators mentioned herein. Forward radiator 1320 works as previously discussed to modify the drag of the craft and helps break the air in front. Radiators 1330 and 1332 control the flow behind the craft in order to enhance the slipstream of the craft.

Energy beam radiators 1340 and 1342 at the end of the wings of the craft operate to break the air at the boundary layer in order to control the laminar flow. These radiators may be useful in correcting for crosswind or yaw conditions and may also help in wind sheer conditions. As the vehicle or aircraft travels in the forward direction through an environmental media such as the atmosphere, the air can move at least partially in a cross direction, perpendicular to the forward direction of the craft, thereby causing a crosswind resulting in a perpendicular drag component on the traveling craft. The energy radiators 1340 and 1342 provide for the modification of vehicle drag in the perpendicular direction thereby enhancing the performance in a crosswind environment. Furthermore, the amount of energy radiated and the location of various energy radiators on the craft may be varied in response to the cross wind experienced by the craft. This type of pulsed systems allows for better cutting to the cross-angled wind. These sensors or ultrasonic devices or optical devices can pulse this into the stream and can be selectively angled to the direction of the wind to improve flow either into or afterwards to decrease turbulence. They can also help to selectively increase turbulence when one wants to selectively increase the drag to improve some of these handling characteristics or to decrease some of the turbulence, pitch, yaw or other handling characteristic. Transducer 1340 and 1342 may also be placed along the length of the fuselage to account for the crosswind affect upon the fuselage of the aircraft.

FIG. 13 shows a vehicle 200 traveling in a forward direction though an environmental media moving at least partially in a cross direction perpendicular the forward direction and the vehicle experiencing vehicle drag as a result of the environmental media moving in the cross direction, wherein energy radiators 1340 and 1342 transmit energy beams in the cross direction. The energy beams modify the drag of the vehicle in the cross direction. A cross velocity of the environmental media may be determined and the energy beams transmitted in response thereto.

Radiators 1350 and 1352 are in front of the engines and improve the flow of air into the engine. Engines 1310 and 1312 are preferably jet engines but may also be propeller based engines. Since radiators 1350 and 1352 control the flow of air into the engines, they may be used to feed more air into the engine.

Radiators 1360 and 1362, which are located behind engines 1310 and 1312, control the thrust energy of the engine as it is exhausted.

Figure 14:
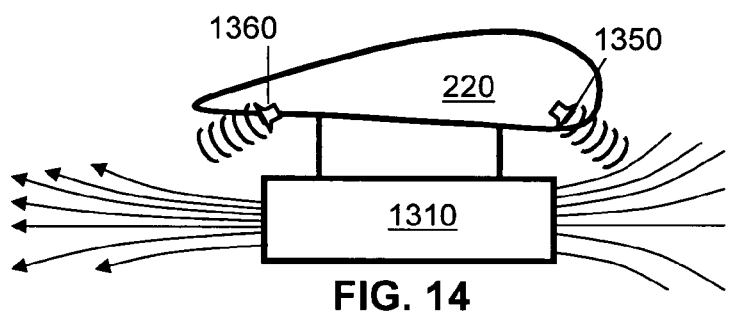
FIG. 14 shows a side view of radiators controlling the flow of air into and out of an aircraft engine in accordance with the present invention.

FIG. 14 shows a side view of radiators controlling the flow of air into and out of an aircraft engine in accordance with the present invention. Jet engine 1310 is attached to wing 220 and the radiator 1350 modifies the flow of air into the jet engine while radiator 1360 modifies the flow of air out of the jet engine. By modifying the flow of air into the jet engine, more or less air may be made to flow into the combustion chamber thereby providing for a means to regulate the efficiency of the combustion of the fuel within the jet engine based upon the various conditions of the craft. Energy beams in front of the engine can improve the airflow into an engine or airflow out of an engine, or limit the suction of the air or the flow of the air. For example, if there is a strong wind or strong fluid flow coming opposite to a propeller or a jet engine, the airflow into the engine or through the propeller would not be as efficient. Pulsing the airflow with energy beams can straighten the airflow out and enhance the pushing or pulling power of the propeller through the engine itself.

By modifying the flow of air out of the jet engine or propeller, the direction or focus of the thrust may be changed. Thus, the lift and forward thrust may be modified by radiator 1360. When the air leaves the propeller or jet engine, it dissipates through entropy. By controlling the flow and direction, more of the energy or more of the wind or force is pushing straight forward or in the desired direction to fly. This can enhance the efficiency of air and improve the efficiency of the engine as of the air leaving an engine may be random or allowed to dissipate. This would force more into a straight line, in the direction of desired force so either flow into the engine or flow out of an engine, into propeller, out of propeller to improve the efficiency.

Figure 15:
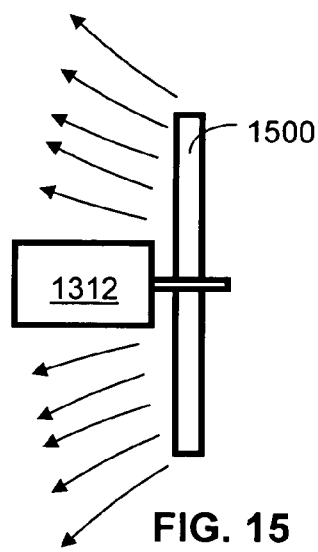
FIG. 15 shows a top view of the airflow of an engine and a propeller assembly before the radiators of the present invention are added.

FIG. 15 shows a top view of the airflow of an engine and a propeller assembly before the radiators of the present invention are added. Engine 1312 has a propeller 1500 attached thereto. As the propeller spins, airflow or thrust is directed out the back of the propeller. However, there is a substantial tangential component to the airflow resulting in a waste of thrust.

Figure 16:
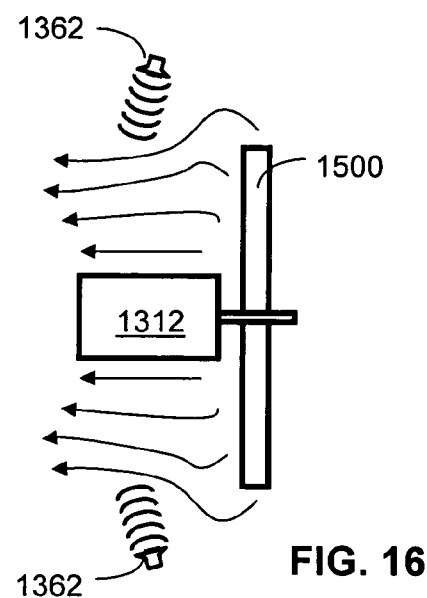
FIG. 16 shows a top view of the airflow of an engine and a propeller assembly after the radiators of the present invention are added.

FIG. 16 shows a top view of the airflow of an engine and a propeller assembly after the radiators of the present invention are added. Engine 1312 has a propeller 1500 attached thereto. As the propeller spins, airflow or thrust is directed out the back of the propeller. However, radiators 1362 work to focus the tangential component to the airflow into a unidirectional component in order to increase the amount of forward thrust, thereby improving the efficiency of the propeller.

Figure 17:
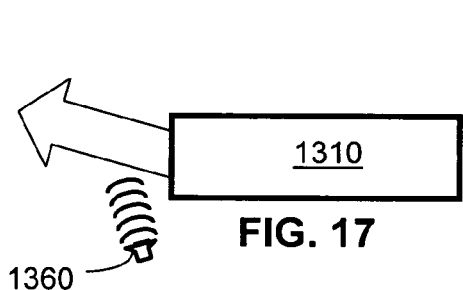
FIG. 17 and FIG. 18 show top views of energy radiators being used to control the angle and direction of thrust from a jet engine in accordance with the present invention.
Figure 18:
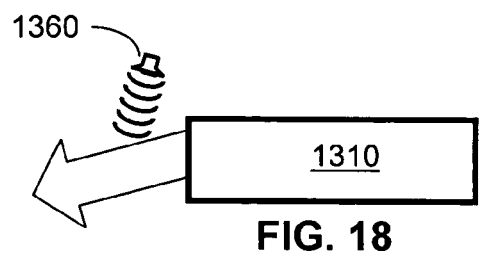

FIG. 17 and FIG. 18 show top views of energy radiators being used to control the angle and direction of thrust from a jet engine in accordance with the present invention. Energy radiator 1360 includes an array of ultrasonic radiators located around the exhaust of the jet engine 1310. If one radiator is turned on, thrust is directed to the right, as in FIG. 17. If another is turned on the thrust is directed to the left, as in FIG. 18. If multiple radiators are used simultaneously, the exhaust can be focused and directed and may direct thrust up and down as well as in the left and right directions. The energy radiators can be large ultrasonic radiators or multiple smaller ones. The energy for combustion may give electricity to power the ultrasonic generators. The generators may be recessed into the exhaust portion of the jet engine in order to improve their aerodynamic characteristics. A movable mount may be used such as the radiator shown in FIG. 9 allowing control of the angle and direction of the energy beam. The radiation direction as well as the focus and direction of the jet exhaust may be controlled remotely in response to air density, temperature, humidity, wind speed, wind direction and/or altitude. Focusing the thrust further has the advantage of taking random air and putting it in a controlled airflow improving the forward thrust. The ultrasonic waves have a wave pattern that helps focus the air pattern out of the engine. It should be further appreciated that the principles herein may be adapted to control of water and other fluids to provide a more unidirectional flow resulting in a more efficient forward thrust.

Energy directors can also be placed on the propeller, on the engine or on a jet for example to improve the wave pattern of fluid going through a propeller, through an engine, through a jet or conversely the air that is exiting to optimize the turbulence or the energy of the air leaving the propeller.

At times it is useful to increase the drag or turbulence of an airflow, thereby disrupting the airflow. This may be done by adjustably, selectively and controllably using a pulse to vary the energy, angle and/or direction of an energy beam as previously described. This can be useful especially for braking. Furthermore, the flow of air on certain locations of the vehicle enhance the stability of the ground effects. Controlling the drag may help improve the response of the vehicle to turbulence and in cross wind and wind sheer conditions. To this end, ultrasonic patches can be used as energy generators to selectively control the turbulence and drag in any of the applications described herein. The ultrasonic patches can be a piezoelectric crystal located within a polymer incorporated into the metal skin of a wing. Alternately, a microwave patch may be used in place of an ultrasonic patch. The energy beams of any or all of those described in the text or shown by the figures may be the ultrasonic patches or microwave patches.

The piezoelectric crystals could be placed on patches or silicone crystals. They vibrate by reversing charge, the vibration will affect the boundary layer. The patches can be created in regular or controlled shapes. The piezoelectric crystals are low power and high force and create controls on the surface of a wing. For example, piezoelectric crystals have two stages, on or off, and they vibrate to create this ultrasonic effect or control the turbulence and/or drag. Thus, one could effectively adjust the turbulence and/or drag, increasing in certain locations, decreasing in certain locations, as necessary. For example, placement on the superior surface of the wing increases the drag, while placement on the inferior surface decreases the drag. The piezoelectric crystals could be either built into the surface, bonded to the surface or could be inside the metallic wing. One could adjust this by effecting superior surface by heat, temperature, electrical or otherwise. The piezoelectric crystals themselves could be inside the surface of the wing or inside the surface of the polymer.

The piezoelectric crystals can be on the superior surface, under surface, patch, or regularly placed along the wing as needed. They could also be placed on a polymeric surface which can flex and extend, at least in part adjusted if not completely by the piezoelectric crystals. There could be pressure sensors, altimeter sensors, temperature sensors, wind direction sensors, etc. which would feed to a computer and allow the computer to progressively control either the continuous flow, the pulsing or the combination of all these energies including thermal, heat, chemical and mechanical adjustments through controlled turbulence-drag and laminar flow. Again, at times in may be desirable to increase turbulence on one portion of a wing and decrease on another portion of the wing, such as a superior and inferior surfaces, or the tip at the end to create more favorable conditions depending on the wind direction and airflow. Again, this type of control applies to boats, cars, aircraft, etc. This could also allow for adjustments of the surface of the vehicle, for example, polymeric surface, or at least in part polymeric surface could be adjusted to increase turbulence or improve flow by flexing or extending a portion.

In another embodiment, heat can affect the drag characteristics either through pulsed, infrared, ultrasound, microwave, thermal energy. One could heat the wing or the superior surface of the wing could be heated. The inferior surface could be cooled or vice versa depending on whether one wants more lift or more drag. Either heat, thermal, electrical, and/or chemical energy can be used on the surface shaped by changing the shape of the surface, either leading edge or some other portion of the surface depending on the speed, the type of current or type of airflow or water flow against this. Heat or electricity can affect a boundary layer. When an aircraft is taking off, more heat below a wing and more cool above the wing is desirable, while during landing more heat on the superior surface and more cool on the inferior surface helps with the braking effect.

The energy radiator of FIG. 9 may be well suited for directing the air going into or out of propellers and jet engines shown by FIG. 13 through FIG. 18.

A slipstream is the turbulent flow of air or water driven backwards by propellers of a craft. A slipstream is also the area of reduced pressure or forward suction produced by an immediately behind fast-moving object as it moves through the air or water. There is a number of ways to affect the slipstream boundary way or laminar airflow layer either in front or behind the vehicle or decrease the turbulence or flow. For example, if three vehicles traveling together in a slipstream with one following another one, all vehicles will travel faster. The slipstream with airflow behind a vehicle can be modified to improve this, as if another vehicle or two is following. This could increase the speed or efficiency or increased fuel economy. This may also help with braking or handling.

Slipstream effects can advantageously be applied to a sailing ship where two sails are placed in such a way as to "tune the sails" so that they would blow air in front of one sail, behind the other sail. The air between the two sails would create a vacuum or decrease pressure that actually increases the efficiency.

FIG. 19 shows a sailing ship with two masts having sails adapted in accordance with the present invention. Sailing ship 1900 has a forward mast 1910 and an aft mast 1920. The forward mast 1910 has a sail having a front surface 1912 and a rear surface 1914 and the aft mast 1920 has a front surface 1922 and a rear surface 1924. The at least a portion of the back surface of the forward mast sail has a friction surface, as shown by the hashed area 1914 and at least a portion of the front surface of the sail on the aft mast has a friction surface 1922 as shown by the hashed area. The friction surface is an aerodynamically rough surface relative to the normal aerodynamically smooth surface of a sail. The aerodynamically rough surface may be a permanently treated as such using a pebbled, grated or sandpaper like surface, or may be selectively or given a frictional or turbulent effect using the aforementioned energy beams and/or patches.

Wind flows from high to low pressure creating a vacuum or suction around the sails to push the boat through the water. As the wind hits the rough area, more friction grabs the sail as the wind travels from the high to low pressure, thereby providing more thrust. The air caught by the front sail creates more vacuum or suction on the back of the forward sail. The roughened surface on the back of the forward sail creates more turbulence or controlled drag and a resulting greater suction effect. The greater the suction effect, the more of a slipstream that is created between the forward and aft sails. The roughed area on the front of the aft sail further takes advantage of the slipstream created by the forward sail and enhances the resulting thrust experienced by the ship. Thus, the ship of FIG. 19 has sails that are at least partially roughened. The roughened area of the forward sail and the roughened area of the aft sail cooperate to enhance the slipstream between the two sails and enhance the thrust provided by the wind.

The roughened or drag sections of the sails can be permanently or selectively controlled via mechanical, electrical, optical or radio control. The drag sections may include a piezoelectric or microwave element such as the previously described patches. The energy provided thereby can also be pulsed to enhance the drag of the portion of the sail. Thus, the sails of FIG. 19 enhance the thrust of the sailing craft. The principals herein can also be applied to aircraft, ground based vehicles such as automobiles as well as keels of boats. In alternate embodiments the roughened areas of the forward and aft sails may be reversed.

FIG. 20 shows a cross sectional view of a first selectively modifiable sail in accordance with the present invention. Sail 2000 is mounted on a mast of a sailing ship, which is preferably a forward mast 1910. Alternatively, sail 2000 could be located on any mast of a sailing ship. Sail 2000 is comprised of a large thin sheet portion and a widening portion that has inflatable billows 2002 through 2004. The billows selectively widen to catch more wind on the sails. The extra section catches more wind on the back of the sail to increase the suction and act like mini spinnakers to catch or control the flow of the wind. These areas can be thickened or selectively controllable to catch more wind allowing for selective modification of an area in the front or behind the sail or between the two sails on a boat or between multiple sails to improve the efficiency of flow between the two sails. In alternate embodiments the roughened areas of the forward and aft sails may be reversed.

FIG. 21 shows a cross sectional view of a second selectively modifiable sail in accordance with the present invention. Sail 2100 is mounted on a mast of a sailing ship, which is preferably an aft mast 1912. Alternatively, sail 2100 could be located on any mast of a sailing ship. Sail 2100 has extra section 2102, 2104 and 2106 that act as selectively opened air pouches to catch air or little suction areas or a little thickening in the sail that open up to increase friction and enhance the thrust of the ship. In alternate embodiments the roughened areas of the forward and aft sails may be reversed.

Figure 22:
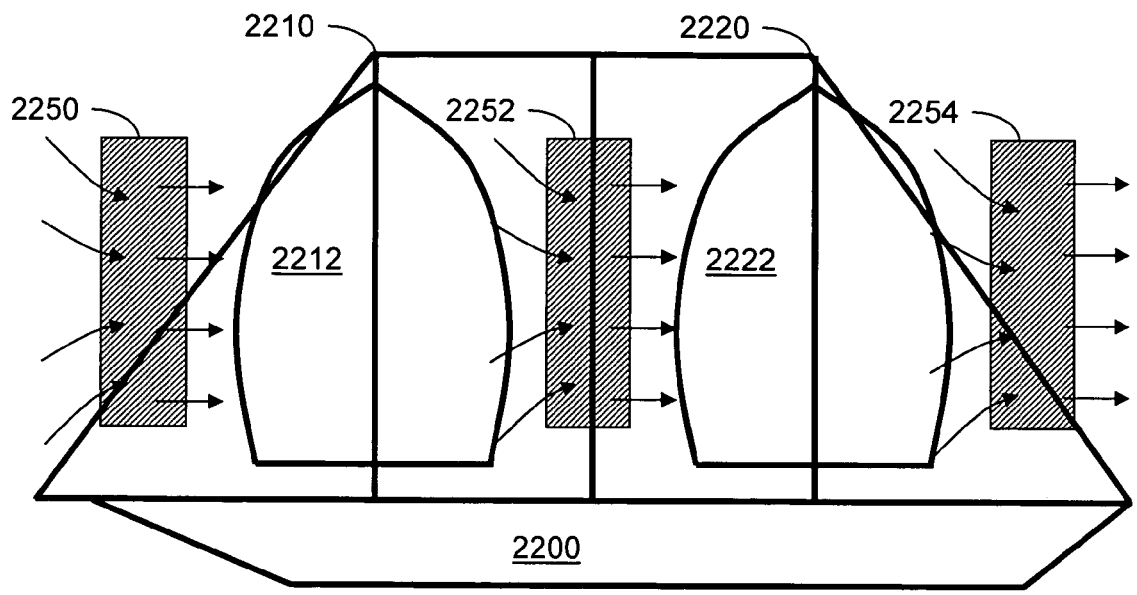
FIG. 22 shows a sailing ship with two masts and sails and a multiplicity of wind director in accordance with the present invention.

FIG. 22 shows a sailing ship with two masts and sails and a multiplicity of wind directors in accordance with the present invention. The sailing ship 2200 has a forward mast 2210, a forward sail 2212, an aft mast 2220 and an aft sail 2222 and a forward wind director 2250, a mid wind deflector 2252 and an aft wind deflector 2254. The wind deflectors 2250, 2252 and 2254 act as wind focusing devices. When a wind focusing device is placed in front of a wing or a sail, it controls the flow against the surface thereof. This may begin to create or control the resulting slipstream. Wind directors may be used to change the flow of air such that the air hits the sail or a wing more directly. The wind directors may be mechanical such as a rigid mesh, foil or poles. Alternatively, the wind directors may use sound waves, pulsed sound waves, electromagnetic or heat.

Forward wing director 2250 focuses the flow of air in front of the forward sail 2212 in order that the wind may hit the front sail more advantageously. Mid wind director 2252 focus the air flow between the forward sail 2212 and the aft sail 2222 in order to enhance the slipstream there between. Aft wind deflector 2254 focus the wind from the aft sail 2222 in order to enhance the thrust experienced by the sailing ship 2200. While multiple sails are more efficient and multiple wind deflectors may be used with multiple sails, it should be appreciated that other combinations may be used. For example, a single sail and a single wind deflector, multiple sails and a single wind deflector, or a single sale and multiple wind deflectors may be implemented in alternative embodiments. Furthermore, the wind deflectors may be used in combination with other improvements presented herein.

Figure 23:
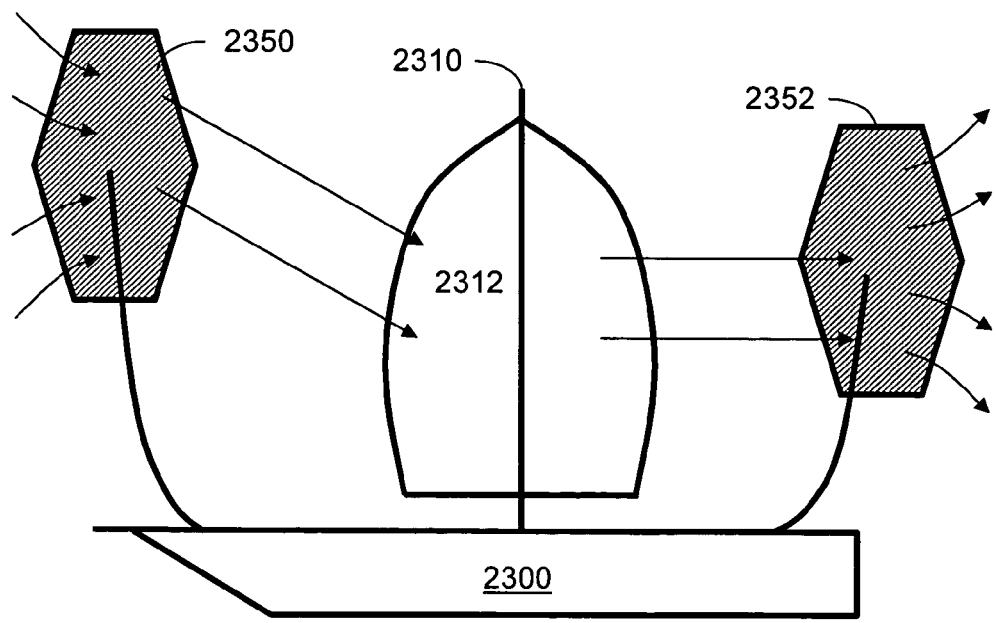
FIG. 23 shows a sailing ship with a plurality of kites in accordance with the present invention.

FIG. 23 shows a sailing ship with a plurality of kites in accordance with the present invention. Sailing ship 2300 has a mast 2310 with a sail 2312. The ship also has a forward kite 2350 and an aft kite 2352. Forward kite 2350 is preferably flying in the air to direct the air to the sail 2312 while aft kite 2352 is behind to enhance the suction or slipstream effect. The kites may have ribbed sections or holes that would allow wind, once it reaches the kite, to change its angle and flow in a specific section so it flows from a kite specifically and directly to the sail in a specific angle. This would change the flow of the air to hit an optimal angle to the sail. The forward kite changes the direction of the wind towards the sail, as the wind leaves the kite. The aft kite can help create the slipstream behind the boat or it acts like an extra sail. The extra sail may provide extra suction behind the sailing craft. It should be appreciated that combinations other than the single sail and multiple kites may be used. For example, a single sail and a single kite, multiple sails and a single kite, or multiple sails and multiple kites may be implemented in alternative embodiments. Furthermore, the kites may be used in combination with other improvements presented herein. Finally, although the term kites is used herein, the term is not limiting and may include equivalent structures. For example, one such equivalent structure includes a parachute.

In alternate embodiments of FIG. 22 and FIG. 23, the wind flow analysis with respect to sails, wind directors and kites may be reversed.

FIG. 24 shows a sailing ship with a keel having variable hydrodynamic characteristics using a variable vertical area in accordance with the present invention. A sailing ship 2400 has a mast 2410 and a keel 2420. The shape of the keel can be selectively modified to enhance the hydrodynamic flow of water around the keel. Expandable keel section 2450 is an additional section that may be selectively expanded from the regular keel section 2420 while the sailing ship is underway. Section 2450 may be expanded either by a blow-up or an inflatable section or under electric or pneumatic controls. Expandable section 2450 may be an internal fin stored adjacent to or within the keel and rotated out of the keel 2420. The amount of rotation may be varied to adjust the overall size of the total keel consisting of the regular keel 2420 and the expandable keel section 2450. The amount rotated may be varied in response to the desired hydrodynamic flow characteristics of the keel. Note that while the vertical area of the keel is variable, FIG. 24 shows the depth of the keel below the hull of the sailing ship remains substantially constant while the vertical area of the keel is varied. In alternate embodiments the vertical shape of the keel may be varied with virtual components in accordance with the teachings herein.

FIG. 25 shows a sailing ship with a keel having variable flow characteristics using a variable horizontal area in accordance with the present invention. A sailing ship 2500 has a mast 2510 and a keel 2520. The shape of the keel can be modified to improve the hydrodynamic flow of water around the keel. Expandable keel sections 2550 and 2560 are additional sections which may be selectively expanded from the regular keel section 2520 while the sailing ship is underway. Sections 2550 and/or 2560 may be expanded either by a blow-up or an inflatable section or under electric or pneumatic controls. The amount expansion may be varied in response to the desired hydrodynamic flow characteristics of the keel. Note that while the vertical area of the keel is variable, FIG. 25 shows the depth of the keel below the hull of the sailing ship remains substantially constant while the horizontal area of the keel is varied. In alternate embodiments the horizontal shape of the keel may be varied with virtual components in accordance with the teachings herein.

FIG. 26 shows a sailing ship with a keel having variable hydrodynamic flow characteristics using an energy beam emitted from the keel in accordance with the present invention. A sailing ship 2600 has a mast 2610 and a keel 2620. The hydrodynamic drag of the keel as it travels through water can be modified to improve flow of water around the keel. Energy radiators 2650 and 2660 emit an energy beam which modifies the drag of the keel through the water using principles previously discussed. The energy beams may comprise acoustic energy such as sub-sonic, sonic or ultra-sonic energy, or may comprise electromagnetic energy such as microwave, infrared, optical or ultraviolet energy. The energy beams may be pulsed.

The flow modifiers 2450, 2550, 2560, 2650 and 2660 are modifiable to enlarge or change the shape of the keel while the sailing ship is underway. Preferably the keel shape is modified in response to changing conditions such as relative wind seed and direction or water speed or temperature in order to modify the thrust characteristics of the sailing ship. The modifications may be automatically or manually invoked by control systems known to those familiar with the art. The techniques of keel modification taught herein may also be applied to the surfaces of other craft including the wing of an aircraft, the hull of a ship or the body of a car.

FIG. 27 and FIG. 28 show front and top views of an aircraft having expandable wing sections in accordance with the present invention. An aircraft 2700 has a wing 2710. The wing 2710 is shown as having two expandable sections 2750 and 2760. In alternate embodiments other expandable sections may be added to surface areas of the aircraft including are areas of the wings and fuselage. The expandable sections are preferably inflatable under pressure, although other methods of creating expandable sections known to those familiar with the art are also anticipated. In the past there have been air boots in front of aircraft that control the icing conditions. In this embodiment, the entire wing can have sections that control airflow. For example, if an aircraft is banking to the right or the left, it may be desirable to make the wing on an opposite side a little bit thicker or larger. One could more or less selectively bubble the wing in one direction relative to the other. This could improve the efficiency significantly. The inflatable sections can be adjusted in response to speed or crosswinds. Changing the shape of the wing or fuselage selectively reduces or increases the drag of the aircraft. The external surface shape may adjusted by small or large amounts by the described malleable sections of the aircraft. These adjustments may be made on other craft such as automobiles or boats, either above the water line on sails of boats or below the waterline on hulls of boats.

FIG. 29 and FIG. 30 show side and rear views of a sailing ship having selectively heated portions in accordance with the present invention. A sailing ship has a keel 2900, a forward mast 2910 and an aft mast 2920. A forward sail has a front portion 2912 and a rear portion 2914 and an aft sail has a front portion 2922 and a rear portion 2924. In this embodiment, the rear portion or back of each sail is heated. Thus, there is heat behind the sail and cool in front of the sail. This creates a thermal gradient between the front and rear of a given sail and between the two sails. The thermal gradient can enhance the airflow and increase the efficiency of the sailing ship in wind. The hull and keel can also be heated in portion 2950 and 2960 to create a heat gradient and enhance the water flow around the hull and keel. The heat could be self generated on moving, thereby creating energy for a battery, infrared, ultrasonic, microwave etc. heating. The heat gradients can be created by a heating grind behind the sail in incorporated within the sail to heat the sail. Ultrasonic generators or microwave generators can be used to create this heat or thermal gradient which could be stitched into the sail, just behind the sail. Similar methods may be used to heat portions of the hull and keel, aircraft wing or other surfaces of other crafts. It should be further noted that the gradient may be created using a pulse of either the heating grid, infrared generator, ultrasonic generator or microwave generator. Since the speed of the craft relates to a wavelength of the media through which the craft is traveling, the frequency of the pulse could be related to the wavelength and corresponding speed and heading. In alternate embodiments the sail side heated of the forward and/or aft sails may be reversed.

FIG. 31 shows a sailing ship with an enhanced virtual waterline in accordance with the present invention. The sailing ship 3100 has a mast and sail 3110 and an energy beam radiator 3150 creating a virtual hull 3160 expending beyond and behind the sailing ship. To some degree, the more surface that is in the water, the faster a sailing ship may travel. Accordingly, extending the waterline may increase the speed and efficiency of the sailing ship. Energy radiator 3150 may be any of the aforementioned radiators including ultrasonic, infrared and microwave. In alternate embodiments the virtual hull of the ship may be extended forward and/or aft of the ship.

A "virtual" vehicle in a slipstream or a virtual sail may improve the efficiency without having to physically have a second vehicle or a second aircraft wing or second sail.

FIG. 32 shows a sailing ship with a virtual sail in accordance with the present invention. The sailing ship 3200 has a mast and sail 3210 and energy beam radiators 3250 which create a virtual sail 3260 which may produce additional sail area. Additional sail area can increase the speed and efficiency of the sailing ship. Energy radiators 3250 may be any of the aforementioned radiators including ultrasonic, infrared and microwave. In alternate embodiments the energy beam radiators may be located on other portions of the ship.

FIG. 33 shows an aircraft having a virtual wing in accordance with the present invention. The aircraft 3300 has a front wing 3310 having energy beam radiators 3350. The rear of the plane has a second energy beam radiator 3355 radiating in a perpendicular direction relative to energy beam radiators 3350. An efficiency improving virtual wing 3360 is shown forming at the intersection of energy beam radiators 3350 and 3360. Although the virtual wing is discussed with respect to the left side of FIG. 33, a complementary virtual wing may be produced on the right side of FIG. 33. Also note that one of the pair of radiator 3350 and 3355 is optional and a virtual wing may be created with only one of the radiators, either 3350 or 3355. Energy radiators 3350 and 3355 may be any of the aforementioned radiators including ultrasonic, infrared and microwave. Virtual wing 3360 or other control surface may be used in addition to or in place of one or more conventional aircraft wings or other control surfaces.

Figure 34:
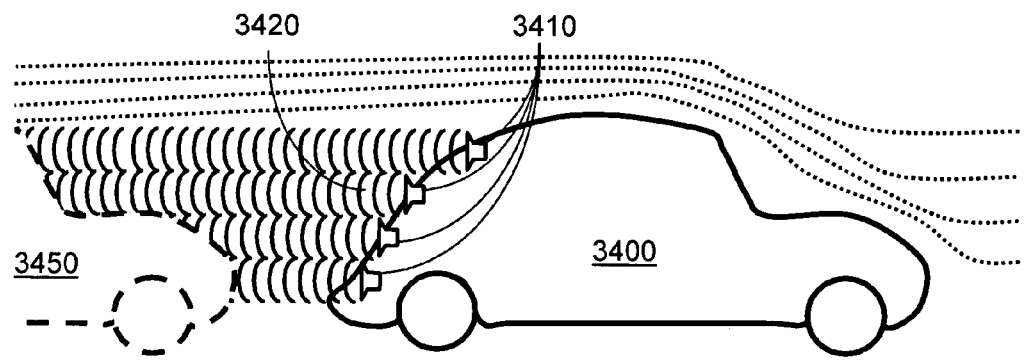
FIG. 34 shows an automobile followed by a virtual vehicle in accordance with the present invention.

FIG. 34 shows an automobile followed by a virtual vehicle in accordance with the present invention. Automobile 3400 has an array of ultrasonic emitters which emit energy beams 3420 which produces a virtual vehicle 3450 or trailing structure following in the slipstream of vehicle 3400. Virtual vehicle 3450 is not a physical three dimensional vehicle but is created by intersecting energy beams emitted from vehicle 3400 increasing the suction behind vehicle 3400. Two generators which would focus specifically on an angle and direction generate two wave patters, the two wave patterns hit each other and then would create a denser area then the air would flow over the location where two ultrasonic generators have focused their energy together. The direction or distance of the virtual vehicle could be controlled further or closer to the vehicle depending on the speed to optimize the location of the slipstream or virtual vehicle. This can be accomplished using the variable direction energy beam radiator, such as that shown by FIG. 9. Since virtual vehicle 3450 travels in the slipstream of vehicle 3400, the virtual vehicle does not consume or eat energy and the slipstream encompasses the virtual vehicle resulting in an improved efficiency.

Figure 35:
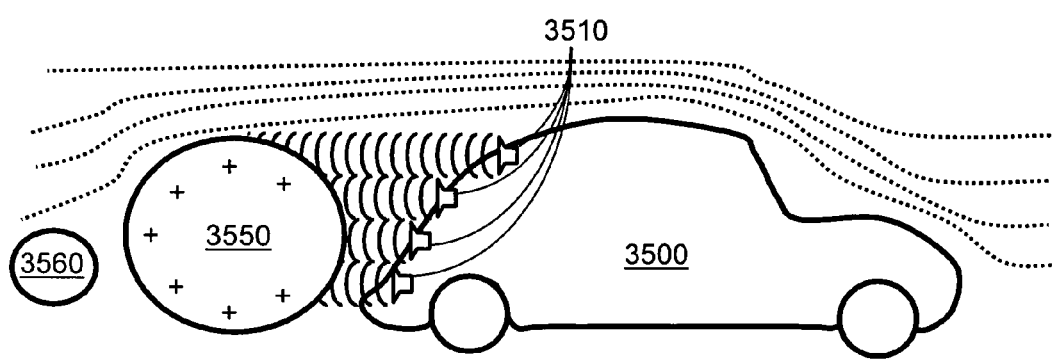
FIG. 35 shows an automobile followed by an alternate virtual vehicle in accordance with the present invention.

FIG. 35 shows an automobile followed by an alternate virtual vehicle in accordance with the present invention. Automobile 3500 has energy radiators 3510 which create a virtual vehicle 3550, 3560 consisting of charged particles. The charged particles may be acoustically, chemically or electromagnetically generated using microwaves, chemical compounds, or ultrasonic waves or a combination thereof and can be induce into the air and then change the airflow. The charged particles could be emitted from the vehicle itself and then utilized in front or behind the vehicle via electric current to improve the boundary layer, boundary flow. The charged particles could be pulsed out in the area or could be created by the vehicle or by the engine. The charged particles of virtual vehicle 3550 may be in the form of a balloon, metallic, plastic, deflector, or a mesh. When the energy beams emitted by vehicle 3500 hit the elements of the virtual vehicle, a large virtual structure is created. The structure may be a wing, wave, automobile or other form enhancing power and fuel consumption. Alternate embodiments may use multiple virtual structures 3550 and 3560 sized to facilitate the slipstream effect.

While the virtual vehicle of FIG. 34 and FIG. 35 is described with respect to an automobile, the virtual vehicle may also have application in aircraft and watercraft. Virtual structures can also be used in various components of aircraft, watercraft and ground vehicles such as aircraft wings, watercraft sails and automobile spoilers. Furthermore, the following principles may be combined to produce improvements in craft transportation. Efficiency, forward propeller energy, energy storage, stability, braking, handling, force in position direction, control of air or fluid, landing and stopping, selectively decreasing and/or increasing drag, laser or other electromagnetic energy to cut through the air or water in front of the craft, increase the surface area or water line of a sailing craft to improve speed, virtual vehicle or virtual sailboat extension to increase the water line, controllable wavelength, direction and tilt of energy beams may be used to implement improvements, pulsed particles and computer controls.

Selectively disrupting the airflow allows for enhanced handling and braking. One could selectively control the drag of turbulence by pulsing the energy angle. Flow at certain locations in the vehicle enhances the stability "ground effects". Enhanced ground effects increase the suction effect of a vehicle against the ground, to create ground effects around the vehicle. Using mechanical structures to do this simply by controlling the wave patterns may decrease the turbulence and may help with lift and selectively increase turbulence to lift or increase the turbulence above to improve handling as one is landing especially with crosswinds. In the past, simple airfoils, such as vehicle spoilers, were the primary things that were used to control the airflow behind the vehicle. These spoilers are all fixed shape, fixed angle and did not effectively control the flow depending on the variable speeds. Using the teachings herein, a virtual spoiler can be varied in size, shape, angle, or distance from the vehicle. For example, under a standard condition, a spoiler may optimally to be smaller or a specific shape. However, at slower speeds and specific winds and higher speeds with different winds, a spoiler may optimally be further away from the vehicle, higher or greater angle or larger shape. Again, for this to be effective would be like a balloon which would make spoilers thicker or larger when one is going faster or higher away from the vehicle so there will be a lift portion that would lift this spoiler away from the vehicle. Furthermore, one or more ultrasonic generators in front of the vehicle can be used to enhance the ground effects or suction down against the ground or against wind going underneath the vehicle or around the vehicle to control the flow. Techniques similar to the aforementioned can be used to improve the wind resistance of buildings.

The aforementioned techniques for active drag control may be used in combination shape changes in aerodynamic or hydrodynamic surfaces. For example, one could pneumatically and/or mechanically change the shape of the back end, the leading edge, or some surface of the vehicle or wing to improve this efficiency. This could be based on the temperature, the speed, air current, fluid flow, etc. This would improve the mechanics. This all could be computer controlled and/or controlled with television cameras or other known monitors such as air, temperature, fluid, altimeter controls, etc. This could be pulsed or it could be continuous stream, or could be a composite of heat, electric, chemical, or surface shape. By changing the shape of a wing, not just at the leading edge, but on the trailing edge or the superior surface, inferior surface, either pneumatically, mechanically or otherwise, the airflow can be affected to improve the lift or decrease the lift as needed to change the turbulence and/or the drag coefficient on the superior wing. In order to increase the airflow on the lower surface, the drag may be increased so it would improve the lift so the surfaces could alternately change depending on the speed or location along the wing. For example, closer to the fuselage of an airplane more turbulence may be desirable with less turbulence more toward the periphery of the wing and a smoother area. One could control this via computer so that different portions of the wings could be adjusted. Again acoustic energy beams (including subsonic, sonic, ultrasonic pulsed air), electromagnetic energy beams (including pulsed or continuous microwave, infrared, visible light, ultraviolet, laser beams and charged particle exciters), chemical treatments, exhaust gas heating, surface shape, and mechanical could be used.

Figure 40:
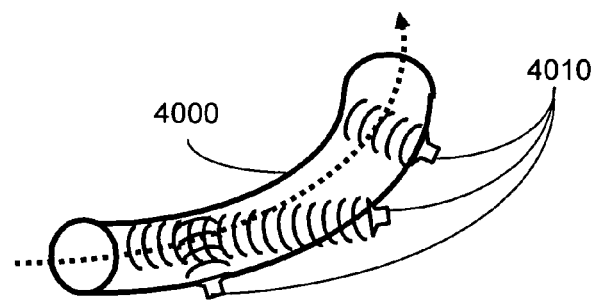
FIG. 40 shows a pipe with energy radiators in accordance with the present invention.

FIG. 40 shows a pipe with energy radiators in accordance with the present invention. Pipe 4000 has preferably ultrasonic energy radiators 4010 for enhancing the flow of liquids, gasses and/or fluids flowing through the pipe. While the aforementioned methods of drag control have been applied to craft traveling through an environmental media, the same advantages can be used for enhancing hydrodynamics of liquids, fluids and gasses flowing through pipes, tubes, manifolds, valves, pistons or other contained structures. This could be used in an intake manifold having an air/fuel mixture flowing within, where the energy beams would deter the fuel from separating from air at the manifold bend. This could also be used in piping or tubing especially if the piping or tubing goes around angles, up, down, sideways, with improved flow through a complex valve system. An area of interest is like the meniscus, fluid traveling through the pipe. An area of turbulence is at the periphery where the fluid is in contact with the pipe. Fluid dynamics or laminar flow can be improved in order to get to the boundary layer quicker. Maximum speed at the surface skin without the turbulent is desirable while decreasing the adherence or to decrease the drag of the boundary layer. This changes the ratio of adhesion to cohesion. This can also be used for piping and tubing in order to improve heart valves in the human body. Alternately, oil flow through a pipe or tubing can be improved, where tubing may have to bend around a certain angle or during a stop cap or irregularity. The energy radiators can be used to decrease the flow or decrease the meniscus type structures so they improve flow. Applications include pipe and tubing whether it is in industry or in the human body. For example, an artificial heart, artificial blood vessels where one may want to enhance flow especially around a plaque or irregularity, can use mini transducers which can be placed in the human body that would enable one to do this. These mini transducers 4010 may be externally controlled, rechargeable, battery operated or could be operated simply on the electrical current created in the human body.

Figure 36:
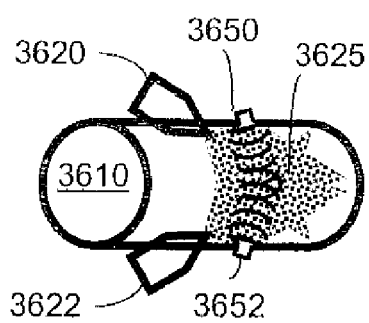
FIG. 36 shows a fuel injected manifold operating in accordance with the present invention.

FIG. 36 shows a fuel injected manifold operating in accordance with the present invention. Manifold 3610 has air flowing through it and forms part of an intake system for bringing fresh air and fuel mixture for combustion in an internal combustion engine. Fuel injectors 3620 and 3622 inject a fuel spray 3625 into the airflow of the manifold. Energy radiators 3650 and 3652 are preferably ultrasonic radiators and produce energy beams for radiating the fuel spray in order to facilitate the atomization of the fuel prior to combustion. The frequency of the ultrasonic radiators may be adjusted to optimize atomization of the fuel spray and compensate for air velocity within the manifold and/or the amount of fuel sprayed. An atomized air/fuel mixture makes for more efficient combustion, the energy beams facilitate the rapid atomization of the fuel spray prior to combustion. Furthermore, the ultrasonic sensors 3650 and 3652 may be placed at various places in the manifold, such as bends in the manifold to deter the fuel from separating with the air as it travels through the manifold bend. In this embodiment, the flow of fuel air mixture, the appropriate mixture going into a cylinder head, could be significantly enhanced by the energy radiators to create a more uniform air/fuel distribution as it is flowing.

Figure 37:
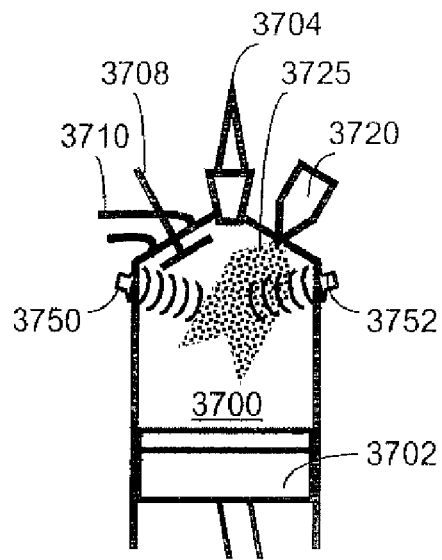
FIG. 37 shows a fuel injected combustion chamber operating accordance with the present invention.

FIG. 37 shows a fuel injected combustion chamber operating in accordance with the present invention. The combustion chamber 3700 is shown as part of a four-cycle internal combustion engine, but other engines are anticipated including two cycle engines, rotary engines and jet and other turbine engines. The combustion chamber has a piston 3702, a sparkplug 3704 and an intake valve 3708 coupled to an intake manifold 3710. During an intake stroke, fuel injector 3720 injects a fuel spray 3725 into the combustion chamber. Energy radiators 3750 and 3752 excite the fuel spray to facilitate atomization thereof prior to combustion. Atomized air/fuel provides for more even efficient combustion. Energy beams of energy radiators also deter the fuel from separating from the air in the combustion chamber caused by turbulence during intake and compression cycles of the engine. The frequency of the ultrasonic radiators may be adjust to optimal atomization of the fuel spray and compensate for the speed and/or load of the engine. In an alternate embodiment, the ultrasonic generators 3750 and 3752 may be incorporated into a special pattern cut into the head of the piston 3702, valve 3708 or other component of the combustion chamber which inherently generates ultrasonic energy beams in response to combustion chamber airflows during the intake and/or the compression cycles. While the energy radiators of FIG. 36 and FIG. 37 are described as ultrasonic, other energy beams previously discussed are anticipated including microwave radiators. Ultrasonic radiators have the advantage of facilitating atomization of the fuel spray without significantly raising the temperature of the air/fuel mixture, thereby avoiding premature combustion. Microwave radiators may have similar advantages. In alternate embodiments, energy beam radiators can be used in the exhaust system to break down undesirable combustion products such as carbon dioxide and nitrous oxide and other undesirable compounds.

Figure 38:
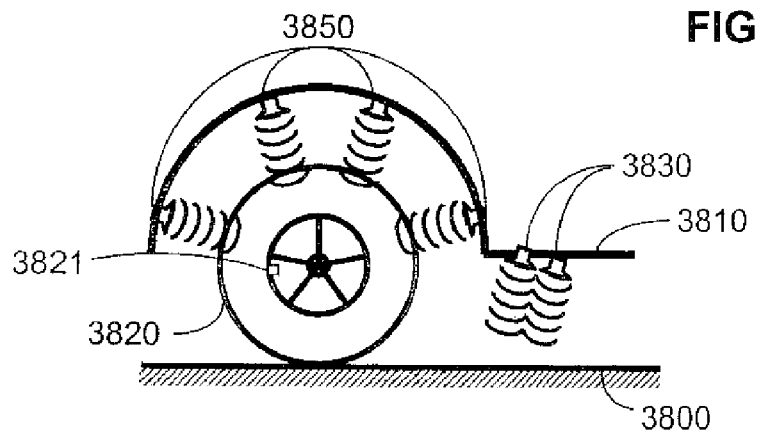
FIG. 38 shows a road surface and a tire heated by energy beams in accordance with the present invention.

FIG. 38 shows a road surface and a tire heated by energy beams in accordance with the present invention. Road surface 3800 has a vehicle 3810 thereon. Vehicle 3810 has at least one tire 3820 for rolling the vehicle 3810 along the road surface 3800. The tire 3820 may provide thrust to the vehicle, being used in acceleration, braking and/or turning of the vehicle requiring traction between the tire and the road. At times the road may be wet or snowy causing it to be slippery and resulting in loss of traction. Energy radiators 3830 heat the road surface in order to melt any snow or dry the road surface to facilitate better traction. For example, if the vehicle is stuck in snow or ice, then upon a signal activating radiators 3830, the snow or ice would melt ahead of the drive wheels of the vehicle providing traction for the vehicle. Radiators may be placed in front and/or in back of the wheels to facilitate forward and/or reverse traction. The radiators may be infrared, microwave, ultrasonic or a blast of air or other fluid or liquid. Radiators 3850 heat the surface of the tire 3820. Since the radiators may be switched off and on in response to a control signal, this provides for the selective heating of the tire. Advantages of selectively heating a tire are set forth below.

Figure 39:
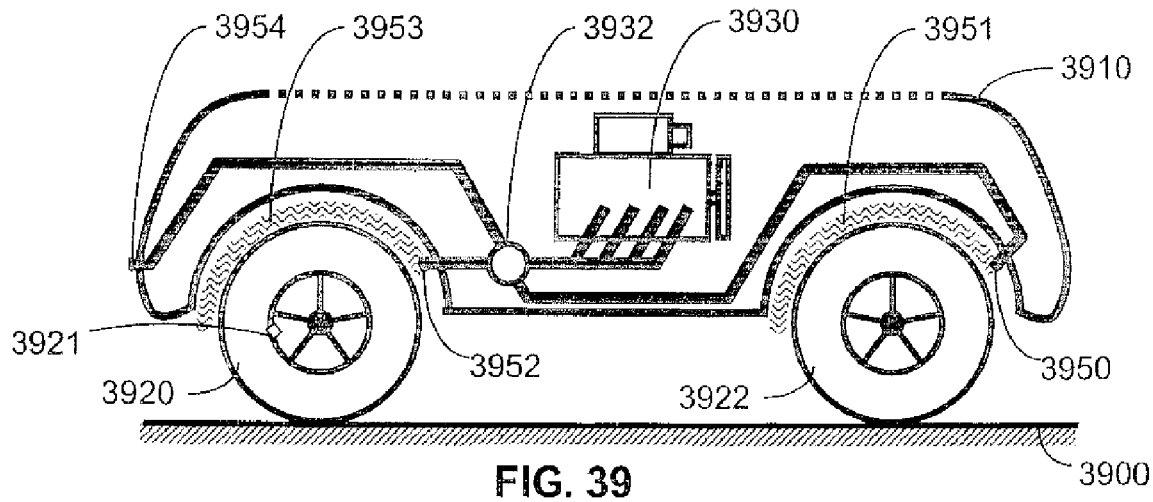
FIG. 39 shows a tire heated by engine exhaust gas in accordance with the present invention.

FIG. 39 shows a tire heated by engine exhaust gas in accordance with the present invention. Road surface 3900 has a vehicle 3910 thereon. Vehicle 3910 has at least two tires 3920 and 3922 for rolling the vehicle 3910 along the road surface 3900. The tires 3920 and 3922 may be used in acceleration, braking and/or turning of the vehicle requiring traction between the tire and the road. Vehicle 3910 has an engine, preferably and internal combustion engine which produces hot exhaust gas. The hot exhaust gas passes through an exhaust gas valve 3932 that selectively directs a desired amount of exhaust to heat the front tire and/or rear tire or out the rear exhaust pipe 3954 in response to a control signal. Exhaust gas valve 3932 responds to a signal to direct varying amounts of exhaust gas to the tires, or in the absence of the signal, to direct exhaust gasses out the tail pipe. All or a portion of the exhaust gases 3951 can be directed to the front tire nozzle 3950 in the vicinity of the front tire in order to heat the front tire 3922 and improve its traction. Similarly, all or a portion of the exhaust gases 3953 can be directed to the rear tire nozzle 3952 in the vicinity of the rear tire in order to heat the rear tire 3920 and improve its traction. Or, all or a portion of the exhaust can be directed to the tail pipe to reduce or eliminate tire heating. Although it is not shown, all or a portion of the exhaust can be directed towards the road surface in order to dry the road surface or melt snow or ice as previously discussed.

Hot tires provide improved traction under a number of conditions, including performance driving and challenging road environments. However, the benefits of extra traction come at the expense of reduced tread life of the tire. While cooler tires may have longer tread life their traction is degraded relative to hot tires. There are driving environments where maximizing traction is desirable, such as driving on curvy mountain roads or competition driving. There are other driving environments where maximizing tread life is desirable, such as in freeway driving. FIG. 38 and FIG. 39 show various systems for selectively heating a tire. In conditions where increased traction is desired, a first signal is generated and the tires heated. The first signal could either enable radiators 3850 or enable exhaust gas valve 3932 cause heating one or more of the tires. In response to an absence of the first signal radiators 3850 are switches off or exhaust gas valve 3932 directs heat away from the correspond tire and out rear exhaust pipe 3954.

An object here is that vehicles can improve gripping of tires against the ground. Also as one is driving, heat could be siphoned directly to the rubber from tires that would enhance the traction of tires against the ground surface. By controlling this, it would improve the gripping power of rubber tires against the ground or enhance the tread life of the tires. One could also selectively heat the tires with an electrical grid within the tires to keep the rubber warmer and improve the gripping potential against the road. Alternatively, by taking exhaust air directly against the rubber against the tires to heat them or turning the ends of the tires into heat sinks that would selectively heat the rubber which would then heat the road. Also, one could heat the road itself ahead of the tire or behind the tire. Alternatively, electrical fibers or thermal fibers can be incorporated into the tires themselves to facilitate heating of the tires. As the tires rotate during normal driving, they can be heated or cooled to an optimal temperature so when a tire contacts the road it is not the environmental temperature, but a specific temperature or optimal temperature so that the rubber enhances the traction power against the road for speed and driving environment. Furthermore, one could harness the electrical power of the engine 3930 of the vehicle, the exhaust would then go to the heat sinks 3821 and 3921 of the rims or could do this electrically from the alternator of the car, thereby heating the rims or actually heating the tires themselves to get an optimal temperature. This would also improve the traction efficiency against the road and/or improve the gripping power.

Additionally, one could selectively control the air pressure within the tires. Less pressure in a tire is desirable when the conditions are rougher, or more pressure in the tire so there is less surface contact to improve the fuel efficiency. When the conditions are optimal one could control all the tires independently so it can make the tires wider, thicker, more pressure, less pressure and controlled while the vehicle is on the move rather than statically controlling this with all the expense in the car, a computer would be able to optimize the tire pressure. One could pump tire pressure in, increasing or decreasing depending on the road conditions, air pressure, etc., whether they are going to go curved roads, straight roads, freeway driving. If one is going freeway driving may be able to have more miles per gallon if one could decrease the tread contact against the road. This could be done by simply increasing the pressure with the tires a certain amount.

Thus, there are many different features to the invention. It is contemplated that these features may be used either alone or in combination. It should be understood by those familiar with the art that numerous modifications and equivalent features may be substituted without departing from the spirit and scope of the invention. The scope of my invention is not to be restricted, therefore, to the specific embodiments described, and that equivalent applications, modifications, and embodiments within the scope of the invention are contemplated.

What is claimed is:

1. A traction control system for heating a surface of a tire of a vehicle to increase a traction between the tire and a roadway surface, the system comprising:
    a heating device proximal to the tire and including an ultrasonic energy radiator, the heating device being selectively activatable to direct a thermal energy at the surface of the tire; and
    a control system including a signal generator, the signal generator providing an activation signal to selectively activate the heating device,
    wherein the ultrasonic energy radiator selectively directs an ultrasonic signal in the vicinity of the tire in response to the activation signal, and
    wherein the thermal energy from the activated heating device is sufficient to increase the temperature of the surface of the tire to increase the traction of the tire.

2. A traction control system as set forth in claim 1, wherein the vehicle includes an internal combustion motor and the heating device directs a portion of the exhaust gas of the internal combustion motor in the vicinity of the tire.

3. A traction control system as set forth in claim 1, further comprising a second heating device, wherein the activation signal selectively activates the second heating device to heat the road at a location adjacent to the tire.

4. A traction control system as set forth in claim 3, wherein the second heating device comprises an energy radiator.

5. A traction control system as set forth in claim 4, wherein the energy radiator of the second heating device is selected from the group consisting of an infrared, microwave, and ultrasonic energy radiator.

6. A traction control device as set forth in claim 4, wherein the energy radiator of the second heating device is an ultrasonic energy radiator, the ultrasonic energy radiator selectively directing an ultrasonic signal to heat the road at the location adjacent to the tire in response to the activation signal.

7. A traction control system as set forth in claim 3, wherein the vehicle includes an internal combustion motor and the second heating device directs a portion of the exhaust gas of the internal combustion motor to heat the road at the location adjacent to the tire.

8. A traction control system as set forth in claim 1, wherein the heating device selectively increases the temperature of the tire to increase a traction of the tire.

9. A traction control system as set forth in claim 1, wherein the signal generator provides the activation signal in response to driving conditions.

10. A traction control system for heating a surface of a tire of a vehicle to increase a traction between the tire and a roadway surface, the system comprising:
    a heating device proximal to the tire, the heating device being selectively activatable to direct a thermal energy at the surface of the tire, the heating device including a heat sink positioned in a rim of the tire; and
    a control system including a signal generator, the signal generator providing an activation signal to selectively activate the heating device,
    wherein the thermal energy from the activated heating device is sufficient to increase the temperature of the surface of the tire to increase the traction of the tire.

11. A traction control system heating a surface of a tire of a vehicle to increase a traction between the tire and a roadway surface, the system comprising:
    an ultrasonic energy radiator proximal to the tire, the ultrasonic energy radiator being selectively activatable to direct an ultrasonic energy at the surface of the tire; and
    a control system including a signal generator, the signal generator providing an activation signal to the ultrasonic energy radiator in response to driving conditions, wherein the activation signal activates the ultrasonic energy radiator, and wherein the ultrasonic energy from the activated ultrasonic energy radiator is sufficient to increase the temperature of the surface of the tire to increase the traction of the tire.

12. A traction control system as set forth in claim 11, further comprising a second energy radiator, wherein the activation signal selectively activates the second energy radiator to heat the road at a location adjacent to the tire.

13. A traction control device as set forth in claim 12, wherein the second energy radiator is an ultrasonic energy radiator, the ultrasonic energy radiator selectively directing an ultrasonic signal to heat the road at the location adjacent to the tire in response to the activation signal.

14. A traction control system as set forth in claim 11, further comprising a second ultrasonic energy radiator, wherein the activation signal selectively activates the second ultrasonic energy radiator to heat the road at a location adjacent to the tire.

* * * * *